(12) United States Patent
Wu et al.

(10) Patent No.: US 11,740,703 B2
(45) Date of Patent: Aug. 29, 2023

(54) APPARATUS HAVING GESTURE SENSOR

(71) Applicant: PIXART IMAGING INC., Hsin-Chu (TW)

(72) Inventors: Chung-Yuo Wu, Hsin-Chu (TW); Yi-Hsien Ko, Hsin-Chu (TW); Nientse Chen, Hsin-Chu (TW)

(73) Assignee: PIXART IMAGING INC., Hsin-Chu (TW)

(*) Notice: Subject to any disclaimer, the term of this patent is extended or adjusted under 35 U.S.C. 154(b) by 118 days.

(21) Appl. No.: 17/152,106

(22) Filed: Jan. 19, 2021

(65) Prior Publication Data
US 2021/0165496 A1  Jun. 3, 2021

Related U.S. Application Data

(62) Division of application No. 15/627,824, filed on Jun. 20, 2017, now Pat. No. 10,936,076, which is a
(Continued)

(30) Foreign Application Priority Data

May 31, 2013 (TW) .................................. 102119424
Feb. 24, 2014 (TW) .................................. 103106028

(51) Int. Cl.
*G06F 3/01* (2006.01)
*A63B 24/00* (2006.01)
(Continued)

(52) U.S. Cl.
CPC .......... *G06F 3/017* (2013.01); *A63B 24/0006* (2013.01); *A63B 69/36* (2013.01);
(Continued)

(58) Field of Classification Search
None
See application file for complete search history.

(56) References Cited

U.S. PATENT DOCUMENTS

| | | |
|---|---|---|
| 7,494,430 B2 | 2/2009 | Choi |
| 8,351,910 B2 | 1/2013 | Horodezky et al. |
| | (Continued) | |

FOREIGN PATENT DOCUMENTS

| | | |
|---|---|---|
| CA | 2509954 A1 | 10/2001 |
| CN | 2376962 Y | 5/2000 |
| | (Continued) | |

OTHER PUBLICATIONS

Yu Yue,"Research and Development on Human-Computer Interaction System of In-Vehicle Navigation Device", Chinese Doctoral Dissertations & Master's Theses Full-text Database(Master) Engineering Science and Technology II, Aug. 15, 2007, pp. 70-82.
(Continued)

*Primary Examiner* — Shon G Foley
(74) *Attorney, Agent, or Firm* — Li & Cai Intellectual Property (USA) Office

(57) ABSTRACT

An apparatus having a gesture sensor is provided. The gesture sensor includes an image sensing unit and a processing unit. The image sensing unit can capture at least a gesture image of user. The processing unit is electrically connected to the image sensing unit. The processing unit can send at least a control command according to the gesture image to operate the apparatus.

6 Claims, 18 Drawing Sheets

Related U.S. Application Data division of application No. 14/287,164, filed on May 26, 2014, now abandoned.

(51) Int. Cl.
*A63B 69/36* (2006.01)
*A63B 71/06* (2006.01)
*G06F 3/04845* (2022.01)
*G09B 19/00* (2006.01)

(52) U.S. Cl.
CPC ...... *A63B 71/0622* (2013.01); *G06F 3/04845* (2013.01); *A63B 2024/0015* (2013.01); *A63B 2071/063* (2013.01); *A63B 2220/806* (2013.01); *G09B 19/0038* (2013.01)

(56) References Cited

U.S. PATENT DOCUMENTS

| | | | |
|---|---|---|---|
| 8,913,056 | B2 | 12/2014 | Zimmer et al. |
| 9,103,691 | B2 | 8/2015 | Wäller et al. |
| 2008/0256494 | A1 | 10/2008 | Greenfield |
| 2009/0222206 | A1 | 9/2009 | Burns et al. |
| 2009/0288712 | A1* | 11/2009 | Lang ................ E03C 1/057 |
| | | | 700/282 |
| 2011/0050589 | A1 | 3/2011 | Yan et al. |
| 2011/0221666 | A1 | 9/2011 | Newton et al. |
| 2013/0076615 | A1 | 3/2013 | Iao |
| 2013/0229492 | A1* | 9/2013 | Ose ................ G06F 3/0304 |
| | | | 348/46 |

FOREIGN PATENT DOCUMENTS

| | | |
|---|---|---|
| CN | 1672163 A | 9/2005 |
| CN | 1704886 A | 12/2005 |
| CN | 101372098 A | 2/2009 |
| CN | 101855521 A | 10/2010 |
| CN | 201955771 U | 8/2011 |
| CN | 102221891 A | 10/2011 |
| CN | 102227707 A | 10/2011 |
| CN | 102298493 A | 12/2011 |
| CN | 102299990 A | 12/2011 |
| CN | 102483648 A | 5/2012 |
| CN | 102538765 A | 7/2012 |
| CN | 102575943 A | 7/2012 |
| CN | 102713794 A | 10/2012 |
| CN | 102814036 A | 12/2012 |
| CN | 202904252 U | 4/2013 |
| CN | 103076877 A | 5/2013 |
| CN | 103083886 A | 5/2013 |
| CN | 103119628 A | 5/2013 |
| CN | 103155428 A | 6/2013 |
| JP | 2007301173 A | 11/2007 |
| TW | 200527259 A | 8/2005 |
| WO | 2012134208 A2 | 10/2012 |
| WO | 2013021385 A2 | 2/2013 |

OTHER PUBLICATIONS

China Patent Office, Office Action dated Jan. 26, 2022 for CN application No. 201811131610.X.

* cited by examiner

| waving the hand | start up | starting up the water tap, increasing the current |
| making the fist | shut off | shutting off the water tap, decreasing the current |
| turning the palm in the counterclockwise direction | | |
| turning the palm in the clockwise direction | | |

APPARATUS HAVING GESTURE SENSOR

CROSS REFERENCE TO RELATED APPLICATIONS

This application is a divisional application of U.S. application Ser. No. 15/627,824 filed on Jun. 20, 2017, which is a divisional application of U.S. application Ser. No. 14/287,164 filed on May 26, 2014, and entitled "APPARATUS HAVING GESTURE SENSOR", now pending, the entire disclosures of which are incorporated herein by reference.

BACKGROUND OF THE INVENTION

1. Field of the Invention

The present invention relates to an apparatus having gesture sensor; in particular, to the water supply with a gesture sensor, in which the water supply in the present invention can be a toilet or a water tap.

2. Description of Related Art

Nowadays, infrared sensor toilets and infrared sensor water taps are widely utilized in the bathroom of many public places such as hospital, department store, station or restaurant. People can activate the water tap and the flush device of the toilet without touching the switch by utilizing the infrared sensor toilet and the infrared sensor water tap. Thus, the chance of contact between the hands and the bacteria can be reduced, so as to prevent the infection of some diseases.

The conventional infrared sensor water tap and the conventional infrared sensor toilet each have the simple function of stopping and releasing flow. Taking the recent infrared sensor water tap as example, the infrared sensor water tap can provide and stop the flow, but cannot control the discharge, which described here and in the following means the amount of flow passing through the water outlet during a period of time, of the flow as the traditional water tap, so that the conventional infrared sensor water tap can't provide the various discharge of flow.

SUMMARY OF THE INVENTION

The present invention provides an apparatus having gesture sensor. The apparatus may be a water supply which utilizes a gesture sensor and a control valve to control the discharge of the flow.

The present invention provides an apparatus having gesture sensor. The apparatus may be a water tap which utilizes the gesture sensor to provide various discharge of the flow.

The present invention provides an apparatus having gesture sensor. The apparatus may be a toilet which utilizes the gesture sensor to provide output amount of the flow.

One embodiment in the present invention provides an apparatus having gesture sensor. The apparatus may be a water supply including a body, a control valve and a gesture sensor. The body includes a water outlet to provide flow. The control valve is configured on the body to control the flow. The gesture sensor includes an image sensing unit and a processing unit. The image sensing unit captures the gesture image performed by the user. The processing unit is electrically connected to the image sensing unit. The processing unit sends at least a control command to the control valve according to the gesture image. The control command includes a first-discharge command or a second-discharge command. The control valve can change the discharge of the flow as a first discharge or a second discharge according to the first-discharge command or the second-discharge command. The first discharge is larger than the second discharge.

Another embodiment in the present invention provides another apparatus having gesture sensor. The apparatus is a water supply. The water supply comprises a body, a control valve and a gesture sensor. The body includes a water outlet to provide a flow. The control valve is configured on the body to control the flow. The gesture sensor includes an image sensing unit and a processing unit. The image sensing unit captures the gesture image performed by the user. The processing unit is electrically connected to the image sensing unit. The processing unit sends at least a control command to the control valve according to the gesture image. The control command includes a first water-output command or second water-output command. The control valve can change the output amount of the flow as a first output amount or a second output amount according to the first water-output command or the second water-output command.

Another embodiment in the present invention provides an apparatus having gesture sensor. The apparatus is a water tap. The water tap includes a tap body, a control valve and a gesture sensor. The tap body includes a water outlet to provide the flow. The control valve is configured on the tap body to control the flow. The gesture sensor includes an image sensing unit and a processing unit. The image sensing unit can capture the at least a gesture image performed by the user. The processing unit is electrically connected to the image sensing unit. The processing unit sends at least a control command to the control valve according to the gesture image. The control command includes an increment command or decrement command. The control valve can decrease the discharge of the flow according to the decrement command or increase the discharge of the flow according to the increment command.

The other embodiment in the present invention provides an apparatus having gesture sensor. The apparatus is a toilet. The toilet includes a toilet bowl, a toilet tank, a control valve and a gesture sensor. The toilet bowl includes a water inlet. The toilet tank connects to the toilet bowl and includes a water outlet connecting with the water outlet. The water outlet output the flow to the water inlet. The control valve is configured on the toilet tank to control the flow. The gesture sensor includes an image sensing unit and a processing unit. The image sensing unit captures at least a gesture image performed by the user. The processing unit is electrically connected to the image sensing unit. The processing unit sends at least a control command to the control valve according to the gesture image. The control command includes a first flush command or second flush command. The control valve can control the output amount of the flow as the first output amount according to the first flush command. On the other hand, the control valve can control the output amount of the flow as the second output amount according to the second flush command. The first output amount is larger than the second output amount.

The other embodiment in the present invention provides an apparatus having gesture sensor. The apparatus is a display apparatus which includes a display device and a gesture sensor. The gesture sensor includes an image sensing unit and a processing unit electrically connected thereto. The image sensing unit captures at least one gesture image performed by the user, and the processing unit sends at least one gesture control signal to the display device according to the gesture image so as to control the operation of the display device.

The other embodiment in the present invention provides an apparatus having gesture sensor. The apparatus is a satellite navigation apparatus which includes a display device, a controller and a gesture sensor. The controller establishes a signal link with the display device so as to allow map information and coordinate information to be transmitted to the display device. The processing unit is electrically connected to the image sensing unit and establishes a signal link with the controller. The processing unit may send at least one gesture control signal to the controller according to at least one gesture image, and the controller is used to control the display mode of map and coordinate information on the display device according to the gesture control signal.

The other embodiment in the present invention provides an apparatus having gesture sensor. The apparatus is a golf training apparatus which includes a practice device, an instructing device and a gesture sensor. The gesture sensor includes an image sensing unit and a processing unit. The image sensing unit is used to capture a user's side view when the user is practicing golf. The user's side view includes at least one hand image and at least one leg image. The hand and leg images form an angle. Both of the image sensing unit and the instructing device are electrically connected to the processing unit, and the processing unit is used to determine whether the angle falls within a predetermined range. When the angle falls out of the predetermined range, the processing unit sends an instructing signal to the instructing device to inform the user.

To sum up, the water supply, the water tap, and the toilet in the present invention control the flow by utilizing the gesture sensor and the control valve. Therefore, user can control the water supply, the water tap, and the toilet to provide the discharge or the output amount of the flow without touching the switch.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

Figure 1A:
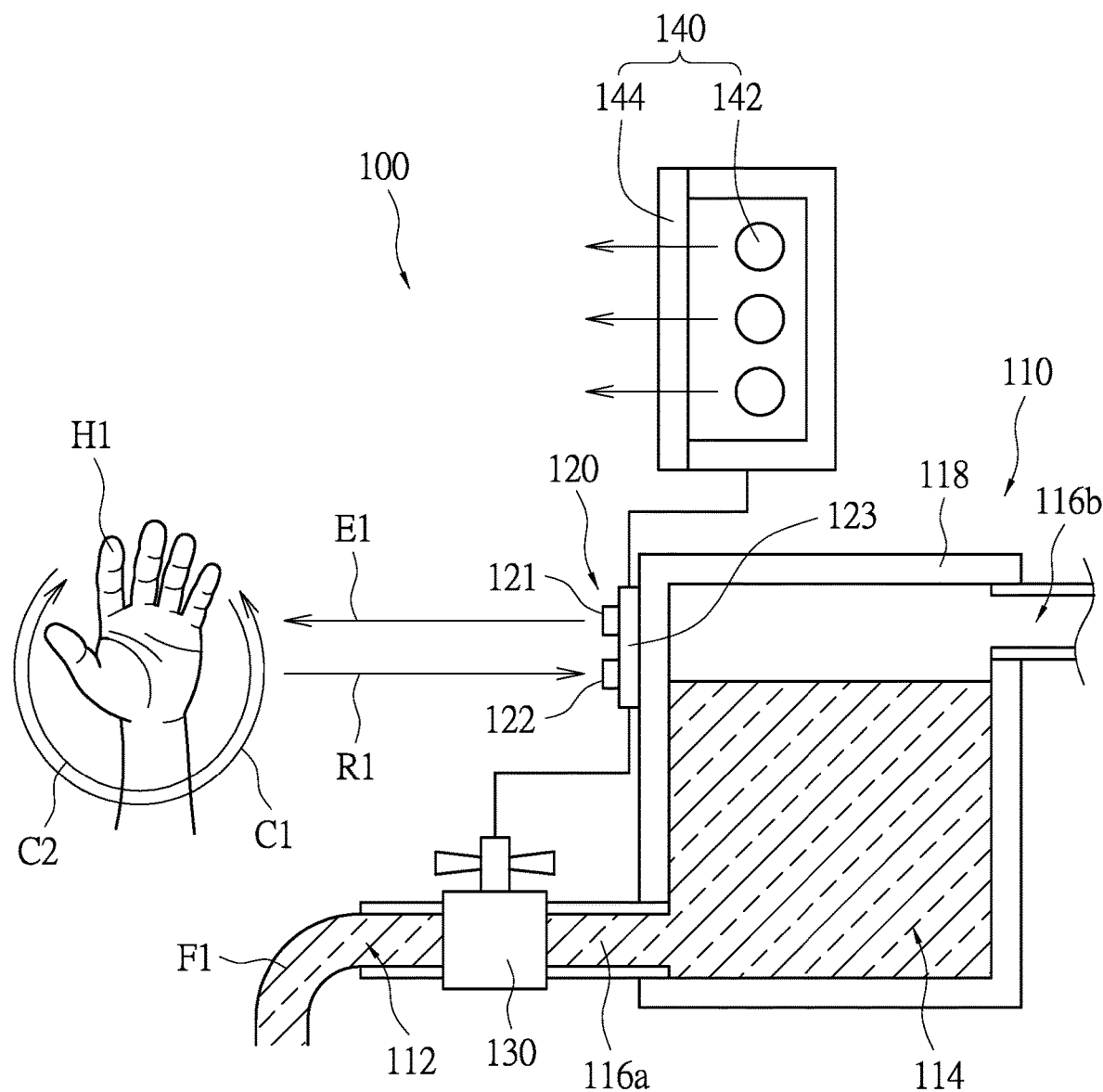
FIG. 1A is a schematic diagram of a water supply in accordance with one embodiment of the instant disclosure.

FIG. 1A is a schematic diagram of a water supply in accordance with one embodiment of the instant disclosure. Referring to FIG. 1A, the water supply 100 can output a flow F1, and can be the water tap, the toilet, or the shower nozzle. The water supply 100 includes a body 110, a gesture sensor 120, and a control valve 130. The control valve 130 is configured on the body 110 to control the flow F1. The control valve 130 can be the solenoid valve. The gesture sensor 120 can sense various gestures performed by the hand H1 of the user and send the corresponding control commands to the control valve 130 according to the gestures. Thus, the control valve 130 can be controlled to release or stop the flow F1, or to change the discharge or output amount of the flow F1.

It worth noting that, the above mentioned output amount is the volume outputting from the water supply 100. The calculating unit of the output amount can be the volume unit, such as liter, milliliter, or gallon, or weight unit, such as kilogram, gram, or pound. In addition, the amount of the output amount is determined by the period of the control valve 130 turned on to supply the flow F1. The longer the control valve 130 is turned on to supply the flow F1, the larger amount of the output amount is. On the contrary, the shorter the control valve 130 is turned on to supply the flow F1, the smaller amount of the output amount is.

The body 110 can store water and include a water outlet 112 and a space 114 to retain water. The water inside the space 114 can flow out from the water outlet 112, so as to supply the flow F1. In addition, the body 110 shown in FIG. 1A includes a tank 118, an output tube 116a, and an input tube 116b. The output tube 116a and the input tube 116b are configured on the tank 118. The output tube 116a includes the water outlet 112. The input tube 116b can guide the water into the space 114.

The body 110 shown in FIG. 1A includes the tank 118, the output tube 116a and the input tube 116b. However, the body 110 can be just a tube without the tank 118 in other embodiment. The body 110 can have various types in different embodiments. FIG. 1A shows only one type of body 110 as example to illustrate.

Figure 1B:
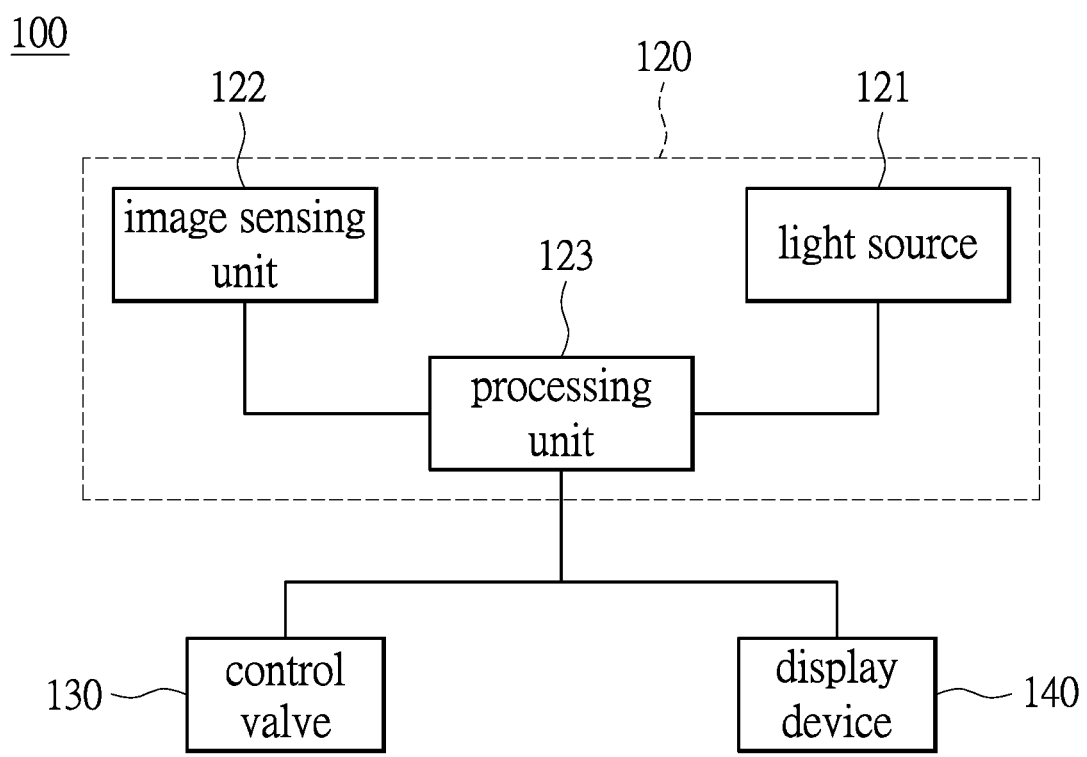
FIG. 1B is a circuit block diagram of the water supply shown in FIG. 1A.

FIG. 1B is a circuit block diagram of the water supply shown in FIG. 1A. Referring to FIGS. 1A and 1B, the gesture sensor 120 includes a light source 121, an image sensing unit 122, and a processing unit 123. The processing unit 123 is electrically connected to the light source 121 and the image sensing unit 122. The light source 121 can emit the light E1 to the hand H1 of user. The light E1 can be the visible light or the invisible light. The visible light can be the infrared ray. Moreover, the light source 121 can be the infrared light-emitting diode (Infrared LED).

The image sensing unit 122 is adjacent to the light source 121 and can capture the image, especially the dynamic image. The above mention dynamic image is formed by the reflection of the light E1. Thus, the image sensing unit 122 can capture the image formed by the invisible light, such as the image formed by the infrared ray. In addition, the image sensing unit 122 can be the complementary metal-oxide-semiconductor sensor (CMOS Sensor) or the charge-coupled device (CCD).

While the hand H1 of the user perform several control gestures, such as making a fist, opening a palm, wave a hand, or turn the palm in the counterclockwise direction C1 or the clockwise direction C2 (as shown in FIG. 1A), the hand H1 can reflect the light E1 to be the light R1. The image sensing unit 122 can receive the light R1, and capture the image from the light R1. Thus, the image sensing unit 122 can capture various gesture images from the various control gestures performed by the hand H1. The gesture images are formed by reflecting the light E1 (which is the light R1).

It's worth noting that, in the present embodiment, the gesture sensor 120 includes the light source 121 to emit the light E1. However, in other embodiment, the gesture sensor 120 can be without the light source 121 and the image of the hand H1 can be captured by the image sensing unit 122 directly. Specifically, the hand H1 can reflect the external light, such as the light source from indoor or the sunlight from outdoor. The image sensing unit 122 can capture the image from the external light reflected by the hand H1. Similarly, the image sensing unit 122 can also capture various gesture images from the control gesture performed by the hand H1. Therefore, the above mentioned gesture image is not limited to be formed by the reflection of the light E1 (which is light R1). The above mentioned gesture image can also be formed by the external light source.

The processing unit 123 is electrically connected to the control valve 130 by the wire, or built up a signal link with the control valve 130 by the wireless technique, such as Bluetooth. The processing unit 123 sending several control command to the control valve 130 to command the control valve 130 release or stop the flow F1 or change the discharge or the output amount of the flow F1. The processing unit 123, such as the digital signal processor (DSP), can be able to judge whether there is the gesture image among various images captured by the image sensing unit 122 corresponding to the control command according to the algorithm, so as to recognize to these control gestures.

The processing unit 123 saves the recognition data. The algorithm utilized by the processing unit 123 to recognize the gestures can be the object recognition algorithm or the object tracking algorithm. While the processing unit 123 utilizes the object recognition algorithm, the processing unit 123 can judge whether there is the object among the images captured by the image sensing unit 122 shaped like the hand. The processing unit 123 can further judge whether the gesture of the object is one of the gesture image. While the processing unit 123 conforms that the gesture of the object is the same as one of the gesture images, the processing unit 123 can send the control command correspond to the gesture image to the control valve 130, so as to control the control valve 130.

While the processing unit 123 utilizes the object tracking algorithm, the processing unit 123 can judge whether the motion trace of the object among the successive images captured by the image sensing unit 122 is conform to one of the gesture images. The above-mentioned object can have a specific shape, such as the shape of the hand or the shape of the electronic device like mobile phone or the game console. While the processing unit 123 conform that the motion trace of the object is the same as one of the motion of the gesture images, the processing unit 123 can send a control command correspond to the gesture image to control the control valve 130.

The control command sent by the processing unit 123 includes the first-discharge command or the second-discharge command. The control valve 130 changes the discharge of the flow F1 as the first discharge according to the first-discharge command, and change the discharge of the flow F1 as the second discharge according to the second-discharge command. The first discharge is larger than the second discharge. The processing unit 123 can command the control valve 130 to change the discharge of the flow F1 according to the first-discharge command or the second-discharge command.

In the embodiment shown in FIG. 1A, the gesture image correspond to the first-discharge command is the palm counterclockwise rotation (turn the hand H1 in the counterclockwise direction C1), and the gesture image correspond to the second-discharge command is the palm clockwise rotation (turn the hand H1 in the clockwise direction C2). Thus, while the user open the hand H1 and perform the palm in the counterclockwise direction C1, the control valve 130 can adjust the discharge of the flow F1 as the high discharge (first discharge). In contrast, while the user opens the hand H1 and turns the palm in the clockwise direction C2, the control valve 130 can adjust the discharge of the flow F1 as the low discharge (second discharge). Accordingly, the user can gain different discharge of the flow F1 by turning the palm in the counterclockwise direction or clockwise direction.

In addition, in other embodiment, the control commands can includes the decrement command or the increment command. For instance, while the hand H1 performs the gesture of the palm counterclockwise rotation, the processing unit 123 sends the increment command to command the control valve 130 to increase the discharge of the flow F1. In contrast, while the hand H1 performs the gesture of the palm clockwise rotation, the processing unit 123 sends the decrement command to command the control valve 130 to decrease the discharge of the flow F1. Therefore, while the user want the large discharge of the flow F1, the hand H1 of the user can perform one or successive gestures of the palm counterclockwise rotation. While the user want the small discharge of the flow F1, the hand H1 of the user can perform one or successive gestures of the palm clockwise rotation.

The control commands can includes water supply command and the water outage command. The water supply command and the water outage command are corresponding to different kinds of gesture images. The water supply command is command the control valve 130 to supply the flow F1. The water outage command is command the control valve 130 to stop supply the flow F1. Specifically, while the control valve 130 starts up and the flow F1 is not supplied, the hand H1 can perform the control gesture corresponding to the water supply command in front of the gesture sensor 120, so that the image sensing unit 122 can capture the gesture image. The processing unit 123 sends the water supply command to the control valve 130 according to the gesture image. At this moment, the control valve 130 open the water outlet 112 according to the water supply command to supply the flow F1.

While the flow F1 is supplied and the user wants to stop the flow F1, the control gesture corresponding to the water outage command can be performed in front of the gesture sensor 120, so that the image sensing unit 122 can capture the gesture image. The processing unit 123 can send a water outage command to the control valve 130 according to the gesture image. Meanwhile, the control valve 130 can shut off the water outlet 112 to stop supply the flow F1 according to the water outage command.

The control commands can further includes a first water-output command or a second water-output command. The control valve 130 can change the output amount of the flow F1 as the first output amount according to the first water-output command and as the second output amount according to the second water-output command. The first output amount is larger than the second output amount. Therefore, the processing unit 123 can command the control valve 130 to change the output amount of the flow according to the first water-output command or the second water-output command. Moreover, the processing unit 123 can setup the sustained time which the control valve supply the flow F1 according to the first water-output command and the second water-output command, so as to change the output amount of the flow F1.

For instance, according to the first water-output command, the processing unit 123 can setup the control valve 130 to continuously supply the flow F1 for 10 second. In addition, according to the second water-output command, the processing unit 123 can setup the control valve 130 to continuously supply the flow F1 for 5 second. Thus, on the premise that the discharge of the flow F1 doesn't change, the first output amount is larger than the second output amount, and the control valve 130 can supply different output amounts.

The water supply 100 further includes the display device 140. The display device 140 is electrically connected to the processing unit 123, or built up a signal link with the processing unit 123 by the wireless technique, such as Bluetooth. The display device 140 can display the condition of the water supply 100, such as the open up condition or the shutdown condition of the water supply 100. The open up condition means that the control valve 130 is switch on and be able to receive the command from the processing unit 123 to release or stop the flow F1 or change the discharge or the output amount of the flow F1. Therefore, while the water supply 100 is in the open up condition, the control valve 130 can control the flow F1 according to the control gesture performed by the user.

On the other hand, the shutdown condition means that the control valve 130 is switch off. While the water supply 100 is in the shutdown condition, the control valve 130 shut off the water outlet 112 and stop supplying the water until the control valve 130 receive the open up command from the processing unit 123. The open up command corresponds to the gesture performed by the user. The image sensing unit 122 can capture the open up gesture image formed by the light R1 or the external light among the open up gesture. The processing unit 123 can command the display device 140 to display the open up condition according to the open up gesture image and open up the control valve 130.

While the water supply 100 is in the shutdown condition, the control valve 130 would not start up by the gesture of the user, unless the hand H1 performs the open up gesture. Moreover, it's worth noting that, the open up command is different from the above-mentioned water supply command. The open up command is utilized to open up the control valve 130, so that the control valve 130 can receive the command of the processing unit 123. The water supply command is only utilized to command the control valve 130 to release the flow F1. Therefore, the open up command to start up the control valve 130 is different from the water supply command to release the flow F1.

In the embodiment shown in FIG. 1A, the display device 140 can include the light-emitting components 142 and the indicator translucent panel 144. The light-emitting components 142 can be such as the light-emitting diode (LED) or the cold cathode fluorescent lamp (CCFL). The indicator translucent panel 144 can be the light transmissive polymethylmethacrylate substrate (PMMA substrate) or the glass substrate. The indicator translucent panel 144 can display the corresponding gestures and the functions according to the various commands (such as the open up command, the first-discharge command, the second-discharge command, the water supply command, and the water outage command).

For instance, the surface of the indicator translucent panel 144 can show the letters or the patterns to represent the gesture of the counterclockwise rotation corresponding to the high discharge (first discharge) of the flow F1, and gesture of the clockwise rotation corresponding to the lower discharge (second discharge) of the flow F1. Therefore, the user can manipulate the water supply 100 according to the content shown in the display device 140. Besides, in other embodiment, the display device 140 can be the liquid crystal display or the organic light-emitting diode display. Thus, the indicator translucent panel 144 can be omitted in the display device 140.

Figure 1C:
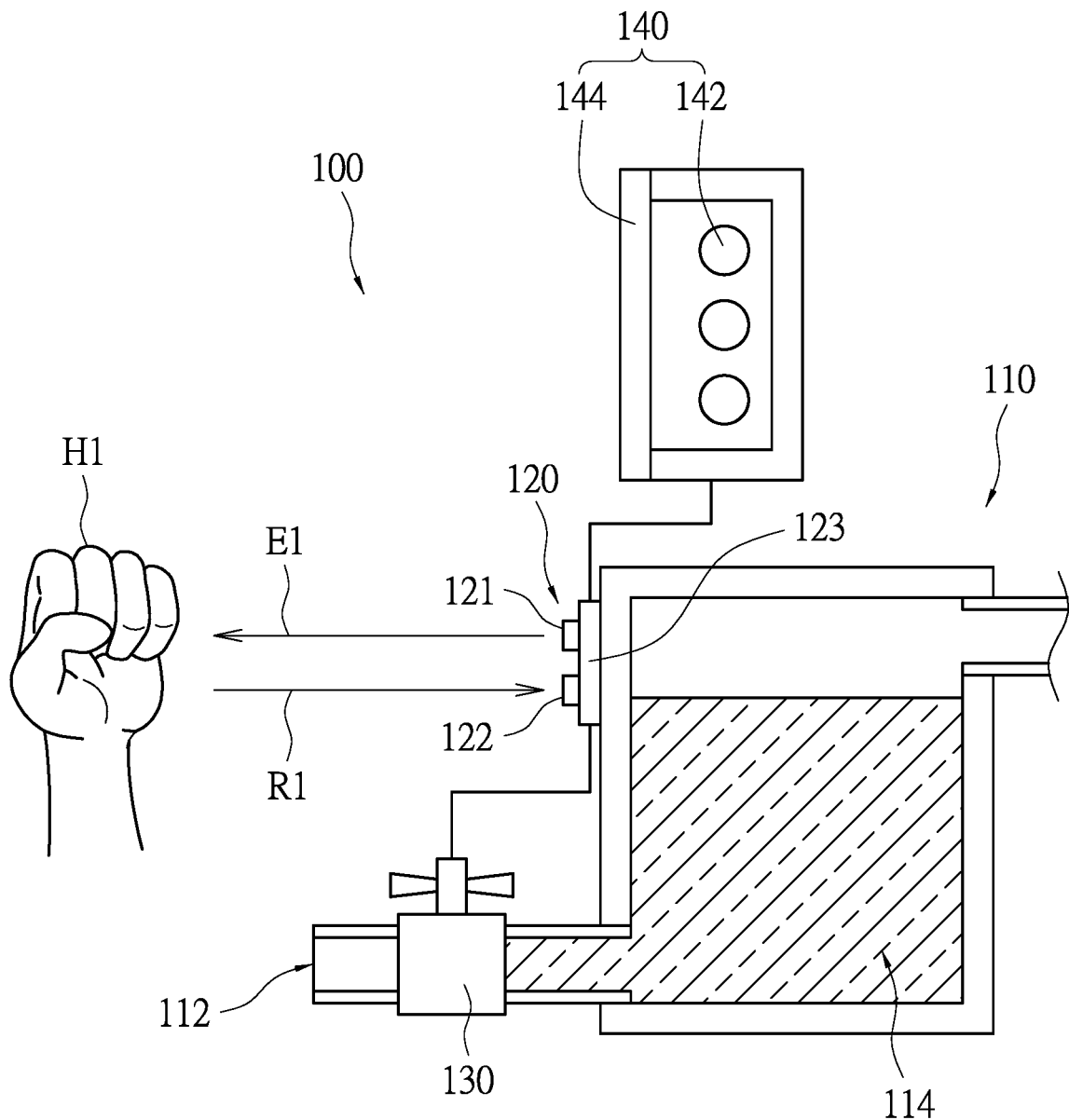
FIG. 1C is a schematic diagram of the water supply shown in FIG. 1A in a shutoff condition.

FIG. 1C is a schematic diagram of the water supply shown in FIG. 1A in a shutoff condition. Referring to FIGS. 1A and 1C, in the present embodiment, while the water supply 100 is in the open up condition, the processing unit 123 can command the display device 140 to display the open up condition according to the open up gesture image. Meanwhile, the light-emitting components 142 emits light toward the indicator translucent panel 144, so as to light up the indicator translucent panel 144, as shown in FIG. 1A.

In contrast, while the water supply 100 is in a shutdown condition, the processing unit 123 can command the display device 140 to display the shutdown condition according to the shutdown gesture image. The shutdown condition corresponds to the shutdown gesture image performed by the hand H1. The image sensing unit 122 can capture the shutdown gesture image formed by the light R1 or external light from the shutdown gesture. The processing unit 123 can shut down the display device 140 according to the shutdown gesture image and send the shut down command to the control valve 130. Thus, the display device 140 display the shutdown condition, and the light-emitting components 142 stop emitting light, as shown in FIG. 1C. Then, the control valve 130 is in the shutdown condition.

In addition, in the present embodiment, the open up gesture image corresponding to the open up command can be opening the palm (as shown in FIG. 1A). The shutdown gesture image according to the shutdown command can be making a fist (as shown in FIG. 1C). Thus, the surface of the indicator translucent panel 144 can show the letters or the patterns to represent the gesture of opening the palm corresponding to the start up of the water supply 100 or the gesture of making a fist corresponding to the shutdown of the water supply 100.

It's worth noting that, in the present embodiment, the control gesture of the first-discharge command and the second-discharge command are the palm counterclockwise rotation and the palm clockwise rotation respectively. The open up gesture corresponding to the open up command is opening the palm. The shutdown gesture corresponding to the shutdown command is making a fist. Nevertheless, in other embodiment, the first-discharge command and the second-discharge command can be corresponding to be other kinds of gesture rather than turning the palm in the counterclockwise direction and clockwise direction, such as wave the hand. In addition, the open up gesture and the shutdown gesture can be other gesture rather than opening the palm and making the fist. Therefore, the open up gesture, the shutdown gesture, and the control gestures mentioned above can be making the fist, opening the palm, waving the hand, turning the palm in the clockwise direction, turning the palm in the counterclockwise direction or the combination of other gestures at random. The present invention does not limit to the action of the open up gesture, the shutdown gesture, and the control gestures.

It's worth noting that, the water supply 100 can be the water tap or the toilet, and the gesture sensor 120 can apply on the water tap. Therefore, the following paragraph takes the FIGS. 2A, 2B, and 3 as an illustration to detail description the embodiment which takes the water supply 100 as the water tap. In addition, the water tap in FIGS. 2A, 2B, and 3 has the similar technique features as the water supply 100. The same technique features of the water tap and the water supply 100 such as the method of gesture sensor recognizing the gesture is omitted thereof.

Figure 2A:
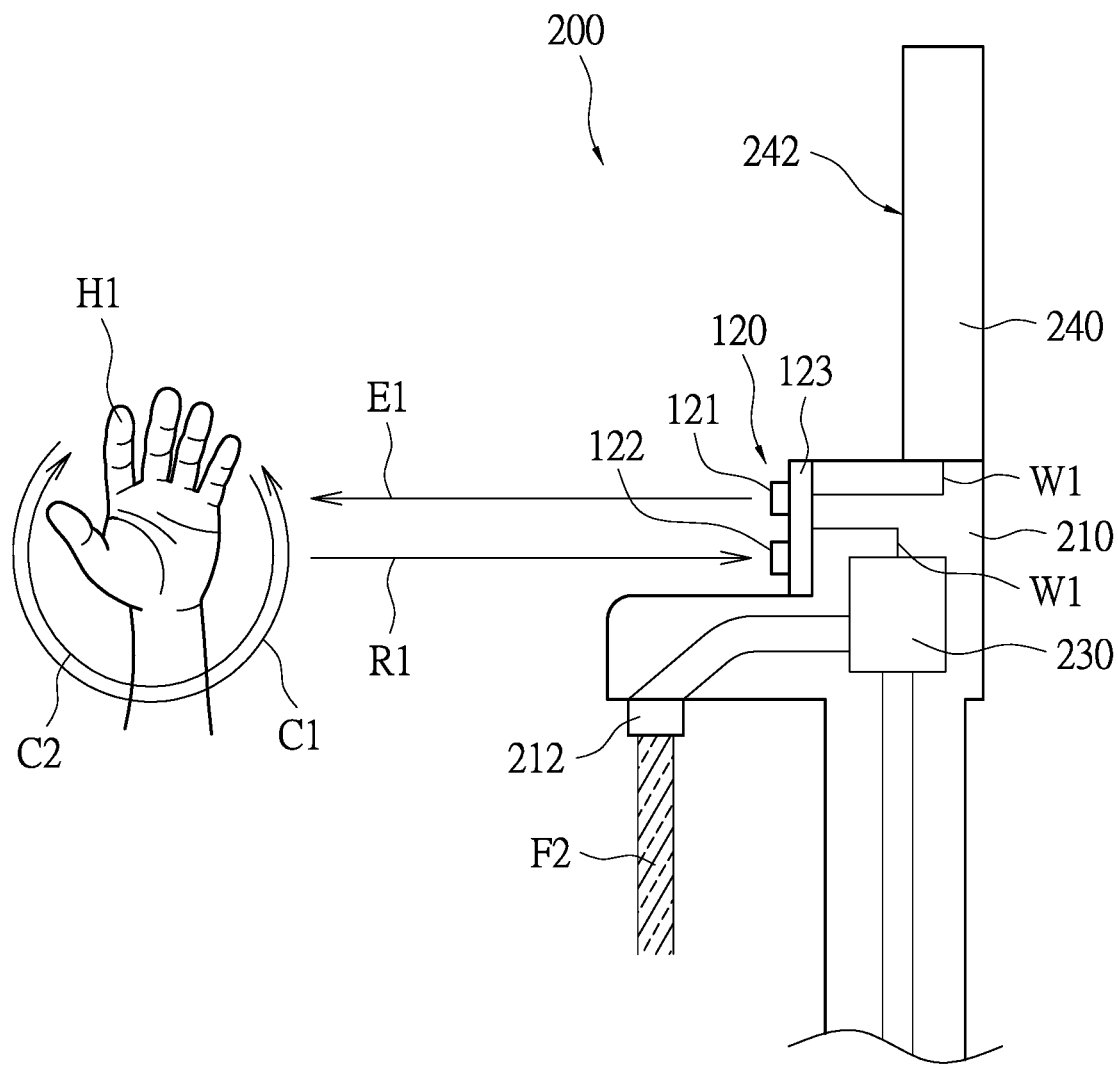
FIG. 2A is a cross-section view of a water tap in accordance with one embodiment of the instant disclosure.

FIG. 2A is a cross-section view of a water tap in accordance with one embodiment of the instant disclosure. Referring to FIG. 2A, the water tap 200 includes the tap body 210, the gesture sensor 120, and the control valve 230. The control valve 230 is configured on the tap body 210 to control the flow F2 outputting from the tap body 210. The gesture sensor 120 can control the control valve 230 according to the gesture performed by the hand H1 of the user, so as to operate the water tap 200 according to the gesture performed by the hand H1.

The tap body 210 includes a water outlet 212 to provide the flow F2. The control valve 230 is configured on the tap body 210 to control the flow F2. The control valve 230 can be the solenoid valve. The gesture sensor 120 is atop of the water outlet 212. The gesture sensor 120 includes the light source 121, the image sensing unit 122, and the processing unit 123. In the present embodiment, the processing unit 123 can electrically connect to the control valve 230 by the wires W1. However, in other embodiment, the processing unit 123 can built up a signal link with the control valve 130 by the wireless technique, such as Bluetooth. The gesture sensor 120 can send the control command to control the control valve 230 by the wires W1 or the wireless technique.

The light source 121 can send out the light E1 to the hand H1 of the user. After reflecting by the hand H1, the light E1 can be the light R1. By utilizing the light E1, the image sensing unit 122 can capture various gesture images from the various control gestures performed by the hand H1. The control gestures includes making a fist, opening the palm, waving the hand, turning the palm in clockwise direction, turning the palm in the counterclockwise direction, or other kinds of gestures. The gesture image is formed by the reflection of the light E1 (which is the light R1). The processing unit 123 can send several control command to the control valve 230 according to the gesture images. Thus, the gesture sensor 120 can control the control valve 230 according to the gesture performed by the hand H1. Besides, the above-mentioned gesture images can also be formed by the external light reflected by the hand H1.

The control command can include the decrement command or the increment command. Specifically, the control valve 230 can decrease the discharge of the flow F2 progressively according to the decrement command, and increase the discharge of the flow F2 progressively according to the increment command. The decrement command and the increment command correspond to different control gestures respectively. For instance, in the embodiment shown in FIG. 2A, the control gesture corresponding to the increment command can be turning the palm in the counterclockwise direction C1. The control gesture corresponding to the decrement command can be turning the palm in the clockwise direction C2.

As above mentioned, while the gesture sensor 120 senses the gesture of turning the palm in counterclockwise direction C1 performed by the hand H1, the image sensing unit 122 can capture the gesture image (the palm counterclockwise rotation) by reflecting the light E1 or the external light. The processing unit 123 can send the increment command to the control valve 230 according to the gesture image. After that, the control valve 230 can increase the discharge of the flow F2 according to the increment command.

While the gesture sensor 120 sense the gesture of turning the palm in the clockwise direction C2 performed by the hand H1, the image sensing unit 122 can capture gesture image (the palm clockwise rotation) by reflecting the light E1 or the external light. The processing unit 123 can send the decrement command to the control valve 230 according to the gesture image. After that, the control valve 230 can decrease the discharge of the flow F2 according to the decrement command. Thus it can be seen that the gesture sensor 120 can control the control valve 230 according to the palm counterclockwise rotation and the palm clockwise rotation, and further control the increasing or the decreasing discharge of the flow F2.

Moreover, similar to the above-mentioned water supply 100, the control command can include the first-discharge command, the second-discharge command, the first water-output command, and the second water-output command. The first-discharge command, the second-discharge command, the first water-output command, and the second water-output command correspond to different control gestures respectively. The control gestures can be making the fist, opening the palm, waving the hand, and the combination of other gestures at random. The image sensing unit 122 can capture the gesture image from the gestures. The processing unit 123 can send the first-discharge command, the second-discharge command, the first water-output command and the second water-output command to the control valve 230 according to the gesture images.

The first-discharge command and the second-discharge command are utilized to change the discharge of the flow F2 respectively. The first water-output command and the second water-output command are utilized to change the output amount of the flow F2 respectively. Specifically, the control valve 230 can change the discharge of the flow F1 as the first discharge according to the first-discharge command, and change the discharge of the flow F1 as the second discharge according to the second-discharge command. The first discharge is larger than the second discharge. The control valve 230 can change the output amount of the flow F1 as the first output according to the first water-output command, and change the output amount of the flow F1 as the second output according to the second water-output command. The first output amount is larger than the second output amount.

In addition, the control valve 230 can determined the first output amount and the second output amount by changing the duration of opening the flow F2.

In addition, similar to the above mentioned water supply 100, the control command includes the water supply command or water outage command. The water supply command and the water outage command correspond to two of the gesture images respectively. The water supply command is utilized to command the control valve 230 to release the flow F2, and the water outage command is utilized to command the control valve 230 to stop the flow F2. The processing unit 123 can send the water supply command or the water outage command to the control valve 230 according to different gesture images. The control valve 230 can start up the water outlet 212 to release the flow F2 according to the water supply command. In contrast, the control valve 230 can shut off the outlet 212 to stop releasing the flow F2 according to the water outage command.

While the user wants the water tap 200 supplying the water to generate the flow F2, the user can perform the control gesture corresponding to the water supply command in front of the gesture sensor 120. Then, the gesture sensor 120 can control the control valve 230 to release the flow F2. While the user wants to shut off the water tap 200 to stop the flow F2, the user can perform the control gesture corresponding to the water outage command in front of the gesture sensor 120. Then, the gesture sensor 120 can control the control valve 230 to stop the flow F2. Therefore, the hand H1 of the user can start up or shut off the water tap 200 by the gesture without touching the water tap 200, so as to reduce the contact chance between the hand H1 and the bacteria. Moreover, control gestures corresponding to the water supply command and the increment command can be the same, and the control gestures corresponding to the water outage command and the decrement command can be the same.

In the present embodiment, the gesture sensor 120 is configured on the tap body 210, and atop of the water outlet 212, as shown in FIG. 2A. Referring to FIG. 2A, the gesture sensor 120 on the top of the water outlet 212 is configured on the upper portion of the tap body 210 and uncovered by the tap body 210. Thus, the user can find out the position of the gesture sensor 120 easily. In addition, the hand H1 can perform several gestures in front of the tap body 210, so as to operate the water tap 200 conveniently.

The water tap 200 can further include the display device 240. The display device 240 can electrically connected to the processing unit 123. In addition, the display device 240 can built up a signal link with the processing unit 123 by the wireless technique, such as Bluetooth. In the present embodiment, the structure of the display device 240 is similar to the structure of the above mentioned display device 140 essentially. That is to say, the display device 240 includes the light-emitting component (not shown in FIG. 2A) and the indicator translucent panel (not shown in FIG. 2A). Thus, the description about the structure of the display device 240 is omitted thereto. In addition, in other embodiment, the display device 240 can be the liquid crystal display or the organic light-emitting diode display, thus the display device 240 shown in FIG. 2A can be without the indicator translucent panel.

The display device 240 includes the display panel 242. The display panel 242 can represent gestures and functions corresponding to various commands (such as the first-discharge command, the second-discharge command, the water supply command, and the water outage command) by showing the letters or the patterns. While the display device 240 includes the indicator translucent panel, and the indicator translucent panel includes the display panel 242, the letters or the patterns can be shown on the display panel 242. While the display device 240 is the liquid crystal display or the organic light-emitting diode display, the display panel 242 can show the scene containing the above mentioned letters or the patterns.

Figure 2B:
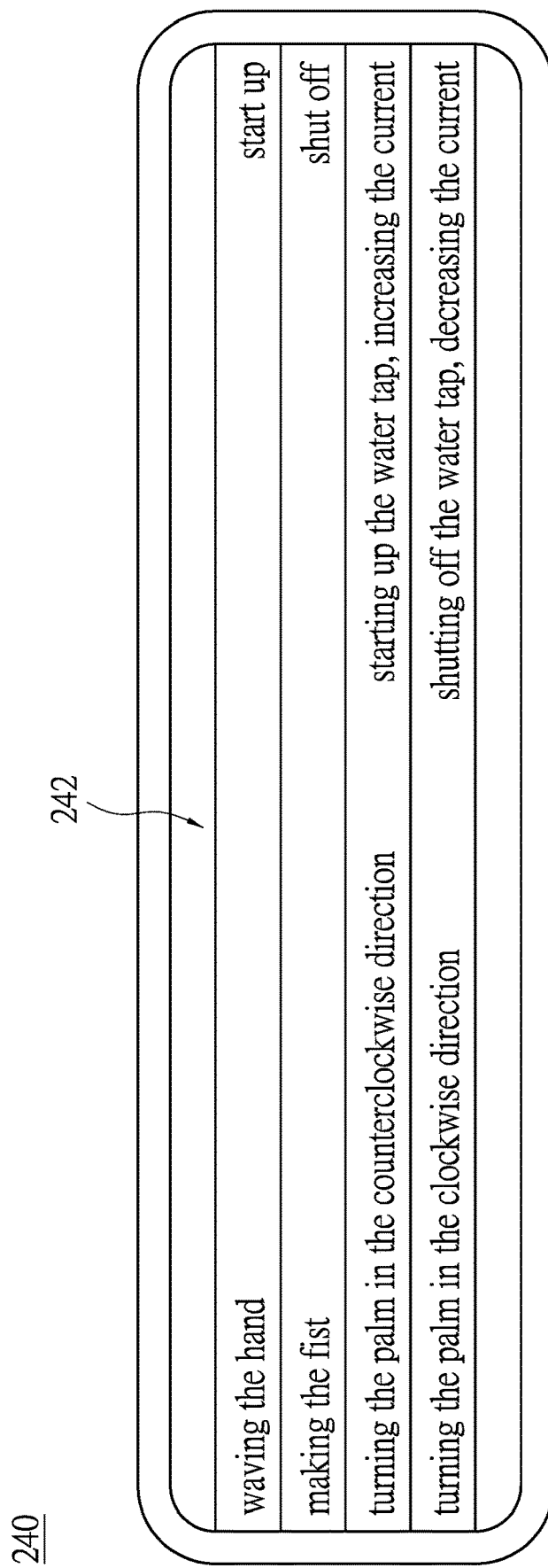
FIG. 2B is a schematic diagram of a display device in the view from the display panel shown in FIG. 2A.

FIG. 2B is a schematic diagram of a display device in the view from the display panel shown in FIG. 2A. Referring to FIGS. 2A and 2B, in the present embodiment, the display panel 242 can display the letters such as "waving the hand", "making the fist", "turning the palm in the clockwise direction", and "turning the palm in the counterclockwise direction" to represent the gesture. In addition, the display panel 242 can also display the letter such as "start up", "shut off", "opening the water tap, increasing the discharge", and "shutting off the water tap, decreasing the discharge" corresponding to the function of the gestures.

Thus, the user can figure out from the display panel 242 that the hand H1 has to perform the gesture of waving hand when start up the water tap 200. On the other hand, the hand H1 has to perform the gesture of making a fist when shut off the water tap 200. When open the water tap or increase the discharge of the flow F2, the hand H1 has to perform the gesture of the counterclockwise rotation. When close the water tap or decrease the discharge of the flow F2, the hand H1 has to perform the gesture of the palm clockwise rotation.

Moreover, the display device 240 can display the condition of the water tap 200, such as displaying the water tap 200 is in the open up condition or in the shutdown condition. Similar to the above mention water supply 100, the open up condition means that the control valve 230 is opening up, and is able to accept the control command (such as the first-discharge command, the first water-output command, and the water supply command) sent by the processing unit 123 to release or stop the flow F2, or to change the discharge or the output amount of the flow F2.

The shutdown condition means that the control valve 230 is shutting down. While the water tap 200 is in the shutdown condition, the control valve 230 can shut down the water outlet 212 and maintain the shutting down condition until the control valve 230 receive the open up command sent by the processing unit 123 to start up. The open up command corresponding to the open up gesture performed by the user, the image sensing unit 122 can capture the open up gesture image formed by the light R1 or external light from the open up gesture. The processing unit 123 sends the open up command according to the open up gesture image to make the display device 140 to display the open up condition and start up the control valve 130.

While the water tap 200 in the shutdown condition, the control valve 230 would not start up by gesture of the user, unless the hand H1 performs the open up gesture. Moreover, the open up command is utilized to start up the control valve 230, so that the control valve 230 can be controlled by the processing unit 123. However, the water supply command is utilized to command the control valve 230 to release the flow F2. Thus, the above mentioned open up command is different from the water supply command.

Concerning about above mention shutdown condition, the image sensing unit 122 can capture the shutdown gesture image formed by reflecting the light E1 or external light from the shutdown gesture performed by the hand H1. The processing unit 123 can shut off the display device 240, such as making the light-emitting component of the display device 240 to stop emitting according to the shutdown gesture image. In addition, the processing unit 123 can send the shutdown command to the control valve 230 according to the shutdown gesture image, so as to make the control valve 230 in the shutdown condition. Moreover, the above mentioned open up gesture and the shutdown gesture can be making the fist, opening the palm, waving the hand, turning the palm in the clockwise direction, turning the palm in the counterclockwise direction, or the combination of other gestures at random.

Figure 3:
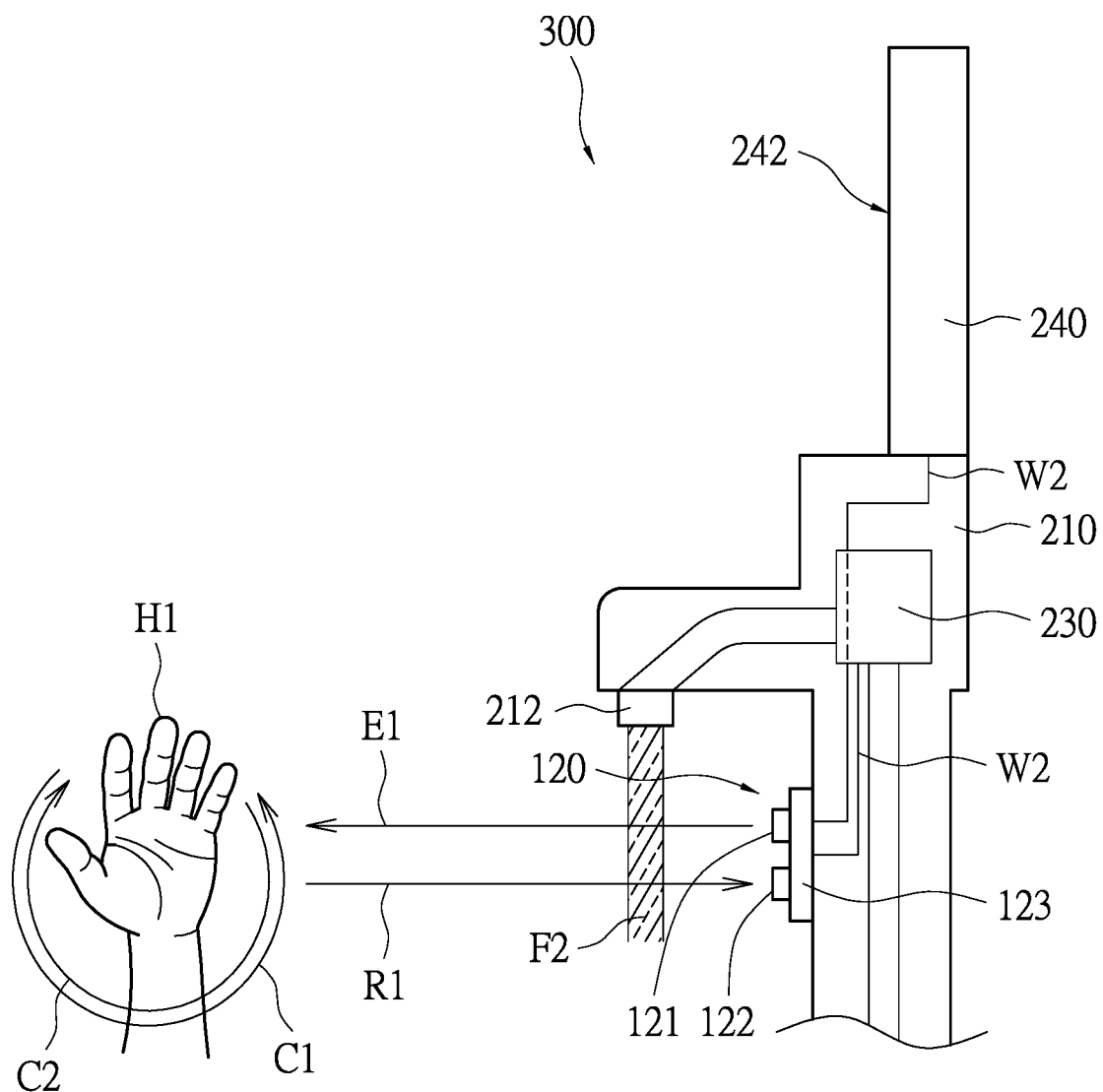
FIG. 3 is a cross-section view of a water tap in accordance with the other embodiment of the instant disclosure.

FIG. 3 is a cross-section view of a water tap in accordance with the other embodiment of the instant disclosure. Referring to FIG. 3, the water tap 300 in the present embodiment is similar to the water tap 200 mentioned above. The description of the similar technique features of both the water tap 200 and 300 is omitted therefore. The difference between the water tap 200 and 300 is that the gesture sensor 120 of the water tap 300 is configured beneath the water outlet 212 and out of the flowing path of the flow F2, On the other hand, the tap body 210 covers the gesture sensor 120 as shown in FIG. 3.

Since the tap body 210 covers the gesture sensor 120, the tap body 210 can shield off partial external light emit into the image sensing unit 122 of the gesture sensor 120. The tap body 210 can decrease some of the background-light noise emitting into the image sensing unit 122, so as to increase the sensing accuracy of the gesture sensor 120. Therefore, the chance that the water tap 300 made the error owning to the influence of noise can be decreased.

In addition, in the present embodiment, the gesture sensor 120 can electrically connect to the control valve 230 and the display device 240 by wires W2, so that the processing unit 123 can send the command to the control valve 230 and the display device 240. Nevertheless, in other embodiment, the processing unit 123 can built up a signal link with the control valve 230 and the display device 240 by the wireless technique, such as Bluetooth. Hence, the gesture sensor 120 can control the control valve 230 and the display device 240 by the wires W2 or the wireless technique.

Expect for the water tap 200, the water supply 100 can be the toilet. In other words, the gesture sensor 120 can be applied to the toilet. FIG. 4A to 4C and FIGS. 5A and 5B are taken as the example to detail illustrate the embodiment of taking the toilet as the water supply 100. In addition, the toilet shown in FIG. 4A to 4C and FIGS. 5A and 5B are similar to the water supply 100. The similar technique features of both the toilet and the water supply 100, such as the method that the gesture sensor recognize the gesture is omitted thereof.

Figure 4A:
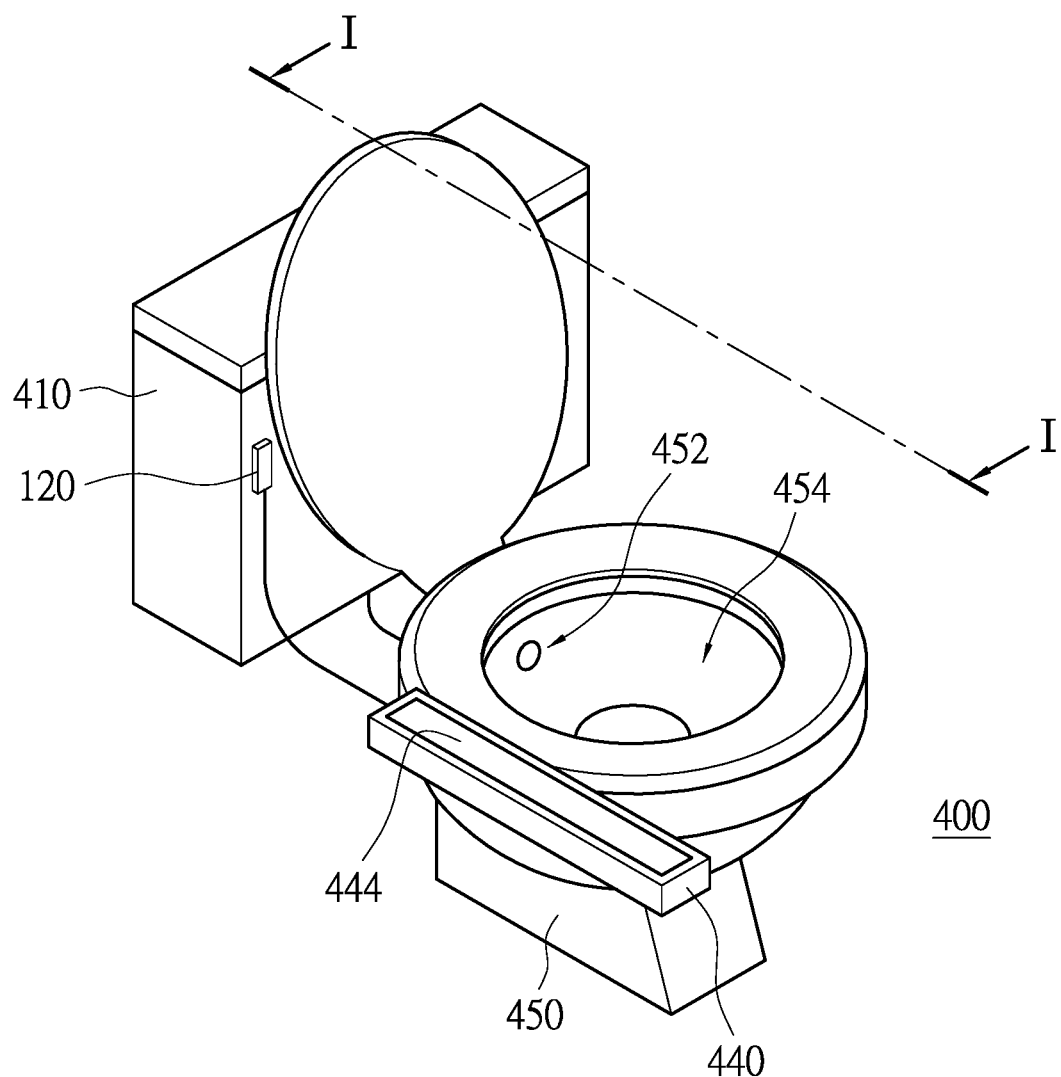
FIG. 4A is a perspective view of the toilet in accordance with one embodiment of the instant disclosure.
Figure 4B:
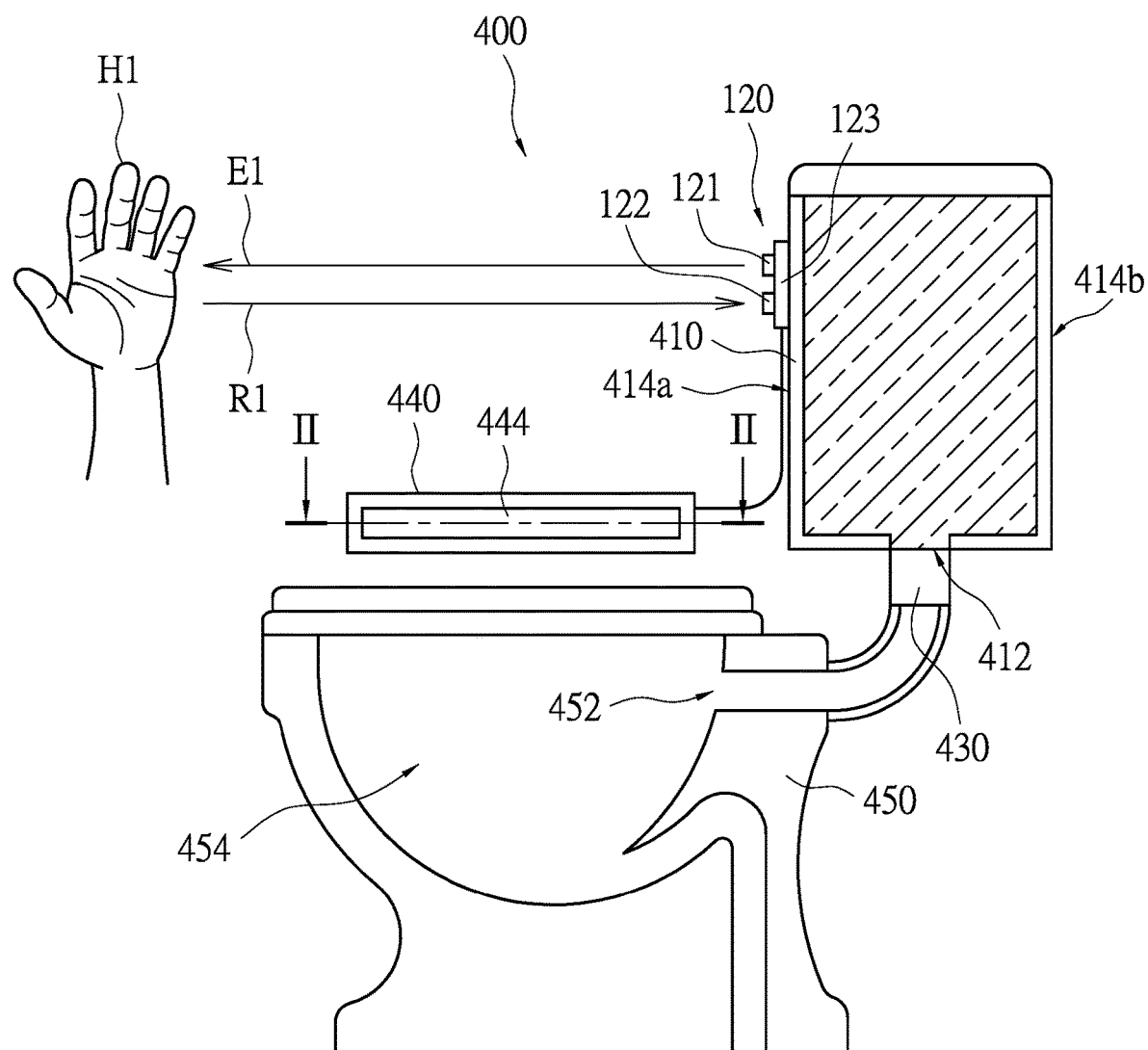
FIG. 4B is a cross-section view of the toilet taken along the line I-I shown in FIG. 4A.

FIG. 4A is a perspective view of the toilet in accordance with one embodiment of the instant disclosure. FIG. 4B is a cross-section view of the toilet taken along the line I-I shown in FIG. 4A. Referring to FIGS. 4A and 4B, the toilet 400 includes the toilet tank 410, the gesture sensor 120, the control valve 430 and the toilet bowl 450. The toilet tank 410 provides the water to wash out the excrement and includes the water outlet 412. The toilet bowl 450 connects to the toilet tank 410 and has the water inlet 452 and the opening 454. The water inlet 452 connects to the water outlet 412. The water outlet 412 can release the flow (not shown in FIGS. 4A and 4B) to the water inlet 452. The water inside the toilet tank 410 can flow into the opening 454 through the water outlet 412 and the water inlet 452.

The toilet tank 410 includes the front side 414*a* and the back side 414*b*. The front side 414*a* is sited between the opening 454 and the back side 414*b*. The gesture sensor 120 is configured on the top of the front side 414*a*. Thus, while the user utilizes the toilet 400 to urinate, the user can perform the control gesture in front of the gesture sensor 120 to make the gesture sensor 120 sensing the control gesture. The control valve 430 is configured on the toilet tank 410 to control the flow.

The gesture sensor 120 can electrically connected to the control valve 430 by the wire, or built up a signal link with the control valve 430 by the wireless technique, such as Bluetooth. Thus, the gesture sensor 120 can send the command to the control valve 430 to control the control valve 430 to release or stop the flow. Moreover, in the present embodiment, the toilet tank 410 can be the water-storage tank. However, in other embodiment, the toilet 400 can be the toilet without the water-storage tank. The toilet tank 410 can thus be the water pipe. The toilet tank 410 is not limited to the water-storage tank.

The gesture sensor 120 includes the light source 121, the image sensing unit 122 and the processing unit 123. While the light source 121 emits the light E1 to the hand H1, the image sensing unit 122 can capture various gesture images from various kinds of control gestures performed by the hand H1. The gesture images are formed by the light R1 (the reflection light of the light E1). The processing unit 123 can send the control command to the control valve 430 according to the gesture images. The control commands include the first flush command or the second flush command. In addition, the gesture sensor 120 can be without the light source 121. The above mentioned gesture images can form by the external light reflected by the hand H1.

The control valve 430 can control the output amount of the flow as the first output amount according to the first flush command, and control the output amount of the flow as the second output amount according to the second flush command. The first output amount is larger than the second output amount. The control valve 430 can control the output amount of the flow by the duration of opening the flow.

Since the gesture sensor 120 is configured on the front side 414*a*, the hand H1 can perform the control gesture of the second flush command in front of the gesture sensor 120 while the user utilizes the toilet 400 to urinate. Therefore, the toilet 400 can release the flow with low output amount to save water. On the other hand, the hand H1 can perform the control gesture of the first flush command in front of the gesture sensor 120 while the user utilizes the toilet 400 to empty the bowel, the hand H1 can perform the control gesture according to the first flush command in front of the gesture sensor 120. Thus, the toilet 400 can release the flow with high output amount to make sure that the excrement is wash out. In addition, the movement of the control gestures can be making the fist, opening the palm, waving the hand, turning the palm in the clockwise direction, turning the palm in the counterclockwise direction, or other gestures.

The toilet 400 can further includes the display device 440. The display device 440 can indicate that the toilet 400 is in the open up condition or in the shutdown condition. The display device 440 can electrically connect to the processing unit 123, or built up a signal link with the processing unit 123 by the wireless technique, such as Bluetooth. Thus, the processing unit 123 can send the command to the display device 440 to control the display device 440. In addition, the processing unit 123 in the present embodiment can send the open up command or the shutdown command. The method to generate the open up command and the shutdown command is similar to the previous embodiment, and the description of the same is omitted thereto.

Figure 4C:
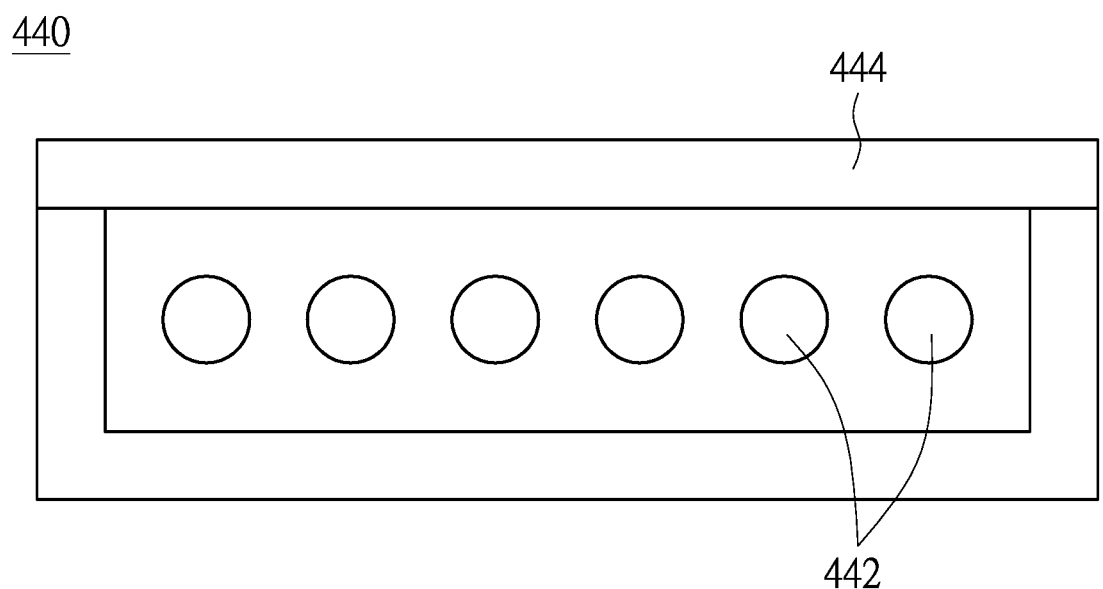
FIG. 4C is a cross-section view of the display device taken along the line II-II shown in FIG. 4B.

FIG. 4C is a cross-section view of the display device taken along the line II-II shown in FIG. 4B. Referring to FIGS. 4B and 4C, the display device 440 includes the light-emitting components 442 and the indicator translucent panel 444. The light-emitting components 442 can be the light emitting diode or the cold cathode fluorescent lamp. The indicator translucent panel 444 can be the light transmissive polymethylmethacrylate substrate or the glass substrate with the operation screen. The operation screen can display the gestures and functions correspond to various commands (such as the first flush command and the second flush command), and can show by the letters or the patterns. While the display device 440 show the operation screen, the light-emitting components 442 can emit the light toward the indicator translucent panel 444, so as to light up the indicator translucent panel 444.

Figure 5A:
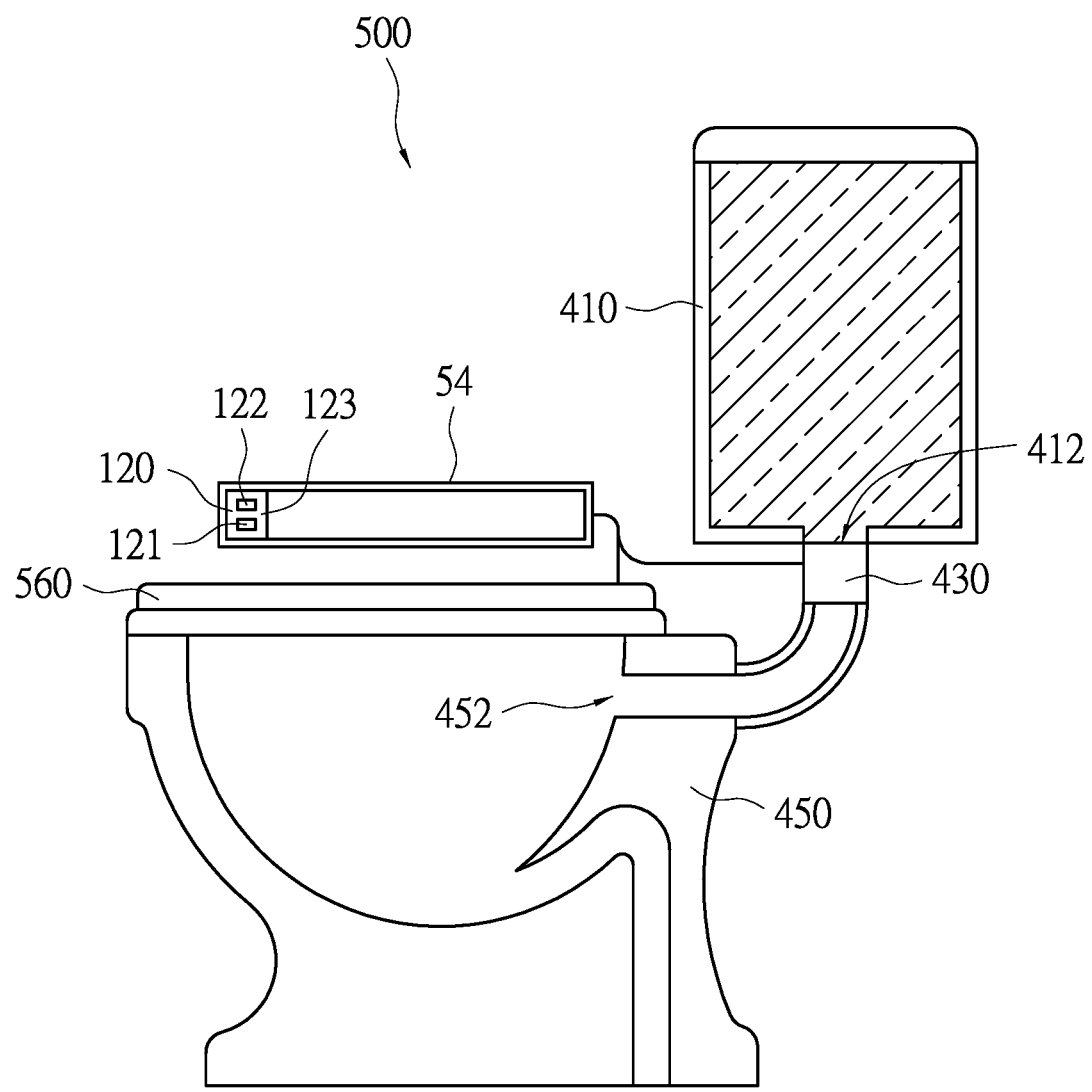
FIG. 5A is a cross-section view of the toilet in accordance with the other embodiment of the instant disclosure.
Figure 5B:
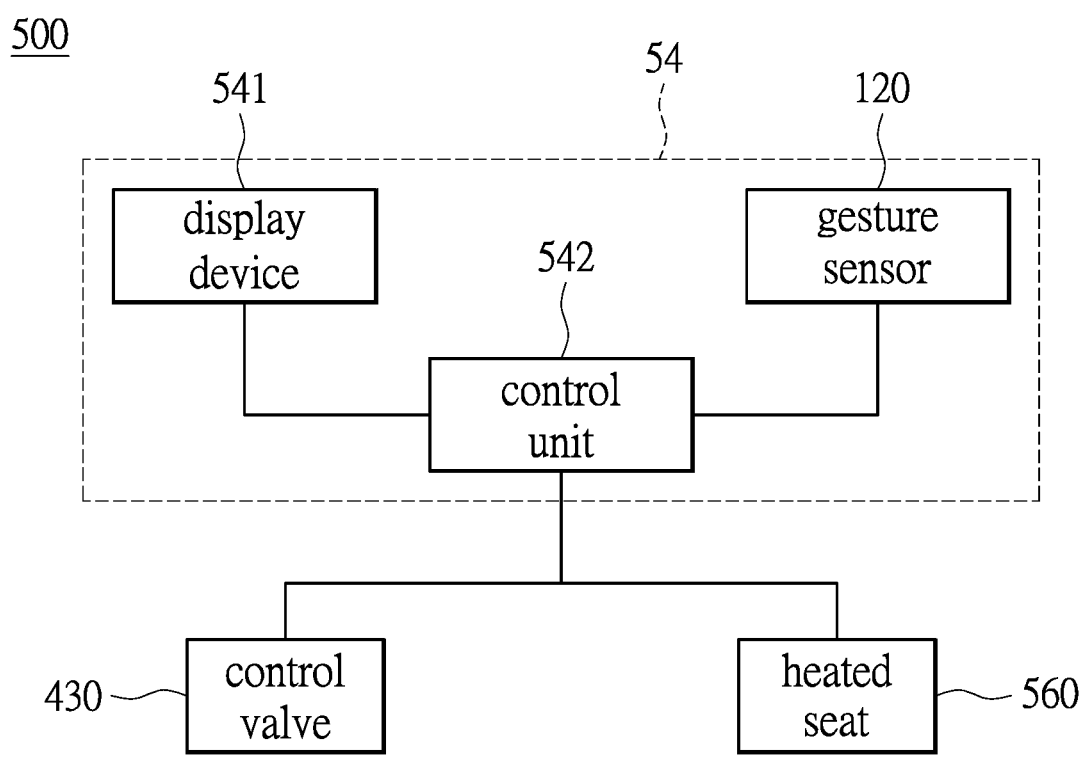
FIG. 5B is a circuit block diagram of the toilet shown in FIG. 5A.

FIG. 5A is a cross-section view of the toilet in accordance with the other embodiment of the instant disclosure. FIG. 5B is a circuit block diagram of the toilet shown in FIG. 5A. Referring to FIGS. 5A and 5B, the toilet 500 in the present embodiment is similar to the toilet 400, the similar technique features of both the toilet 400 and 500 is omitted therefore. However, there exist the different between the toilet 400 and 500. The toilet 500 further includes the control unit 542.

Specifically, the control unit 542 can be the processor and be electrically connected to the gesture sensor 120. The control unit 542, the display device 541 and the gesture sensor 120 can be integrated into the control panel 54 as shown in FIG. 5A. Thus, the user can manipulate the control panel 54 by utilizing the gesture and control the control valve 430 to supply the flow with different output amounts.

In addition, the toilet 500 can include the heated seat 560. The heat seat 560 is configured on the toilet bowl 450 and electrically connected to the control unit 542. The image sensing unit 122 can capture temperature control gesture image from the temperature control gesture formed by the user. The processing unit 123 can send the command to the control unit 542 according to the temperature control gesture, so as to command the control unit 542 to control the temperature of the heated seat 560 according to the temperature control gesture image. The above mentioned temperature control gestures can be making the fist, opening the palm, waving the hand, turning the palm in the clockwise direction, turning the palm in the counterclockwise direction, and the combination of other gestures at random.

It's worth noting that, in other embodiment, the toilet 500 can further includes another gesture sensor 120, the number of gesture sensor 120 included in the toilet 500 can be at least two. The extra gesture sensor 120 can be configured in the front side 414a of toilet tank 410 (referring to FIG. 4B). The seat cover of the toilet 500, such as the heated seat 560, can further configure the switch button (not shown in figure).

While the user utilizes the toilet 500 to urinate, the seat cover can be raised to trigger the switch button. Meanwhile, the switch button can switch on the gesture sensor 120 position on the toilet tank 410 and command the gesture sensor 120 of the control panel 54 to shut off or be in the idle condition. Thus, the user can perform the control gesture to the gesture sensor 120 in the front side correspond to the second flush command, so as to save the flush volume of the toilet 500.

While the user utilizes the toilet 500 to empty the bowl, the seat cover can be putted on the toilet bowl 450 to trigger the switch button. Meanwhile, the switch button can start up the gesture sensor 120 of the control panel 54 and make the gesture sensor 120 of the toilet tank 410 to shut off or be in the idle condition. The user sitting on and utilizing the toilet 500 can perform the control gesture to the control panel 54 corresponding to the first flush command, so as to supply the flow with high output amount. Thus, the excrement can be flush out for sure. In addition, the gesture sensor 120 in FIG. 5A can be configured in the front side 414a of the toilet tank 410 (Referring to FIG. 4B). The toilet 400 and 500 shown in FIG. 4A to 4C, FIGS. 5A and 5B are only the example and not limited to the present invention.

Figure 6A:
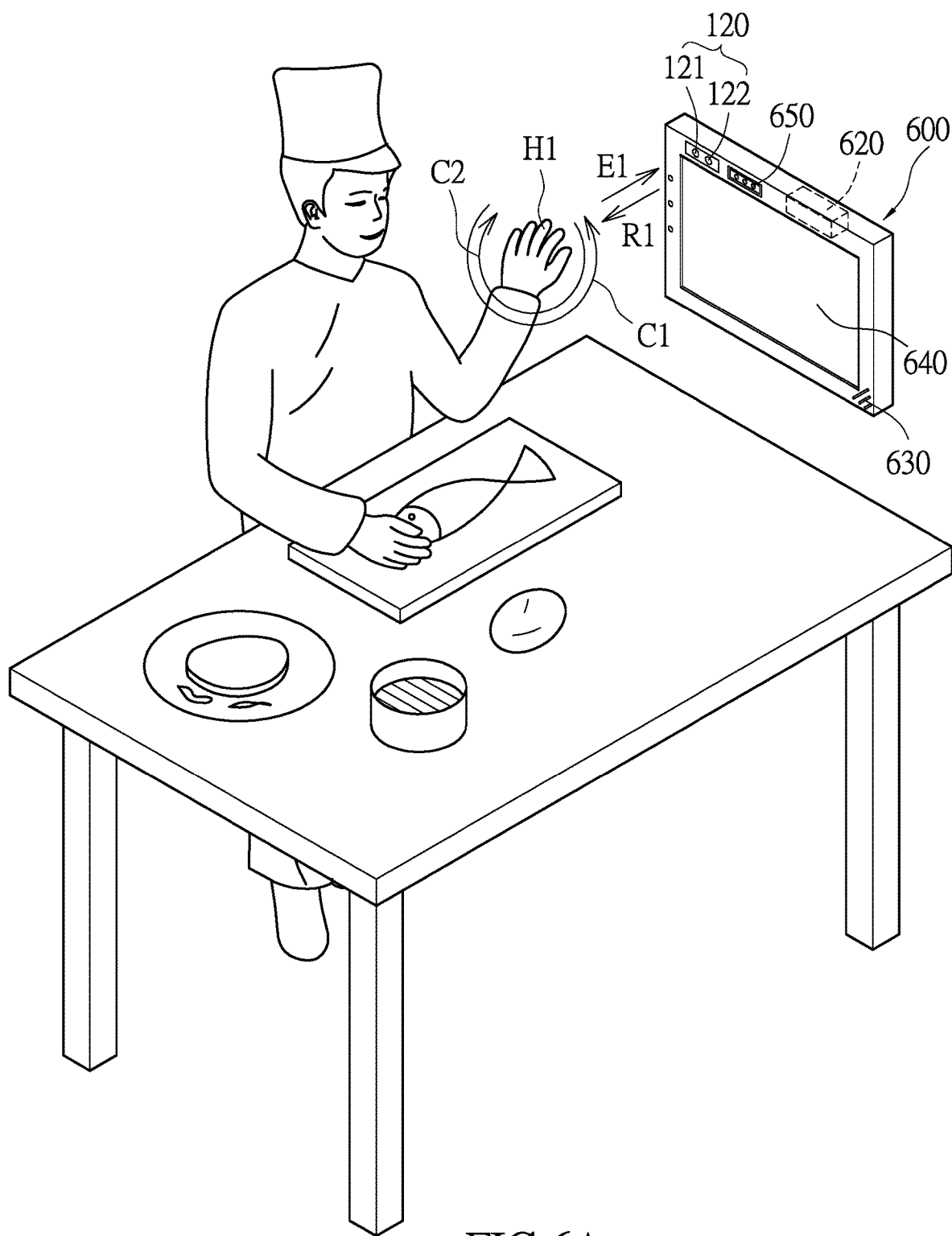
FIG. 6A is a schematic diagram of a display apparatus in accordance with one embodiment of the instant disclosure.

FIG. 6A is a schematic diagram of a display apparatus in accordance with one embodiment of the instant disclosure. Please refer to FIG. 6A. The display apparatus 600 may be controlled without touching a switch or a remote control. That is, even if the user does not touch the switch or the remote control, the user still can control the display apparatus 600. The display apparatus 600 may be used in the environment such as in kitchen, bathroom or hospital where it is not suitable or convenient for the user to control the display apparatus 600 by touching the switch or the remote control. For example, the display apparatus 600 may be a bathroom television, a kitchen television or a medical display apparatus.

The bathroom television is set in the bathroom and capable of operating in humid environment such as in bathroom. Compared to general television, the bathroom television has better waterproof and wet fastness properties. In one embodiment, the kitchen television for use in kitchen is capable of operating in higher temperature and high oil smoke environment. In addition, the medical display apparatus may be implemented in a treatment instrument or in a medical examination instrument for display information. For example, the medical display apparatus may be implemented in an endoscopy, a magnetic resonance imaging (MRI) instrument, a computed tomography (CT) or a helical tomotherapy treatment instrument for display.

In one embodiment, the bathroom television is taken as an example. In the kitchen, the user may be dealing with or cooking food ingredients so that the user inconveniently holds the remote control or touches the switch to control the kitchen television by hands stained with oil, water or food indigents (such as flour or raw meat). The display apparatus 600 in accordance with one embodiment of the instant disclosure may be controlled by the user without using any remote control or touching the switch.

Figure 6B:
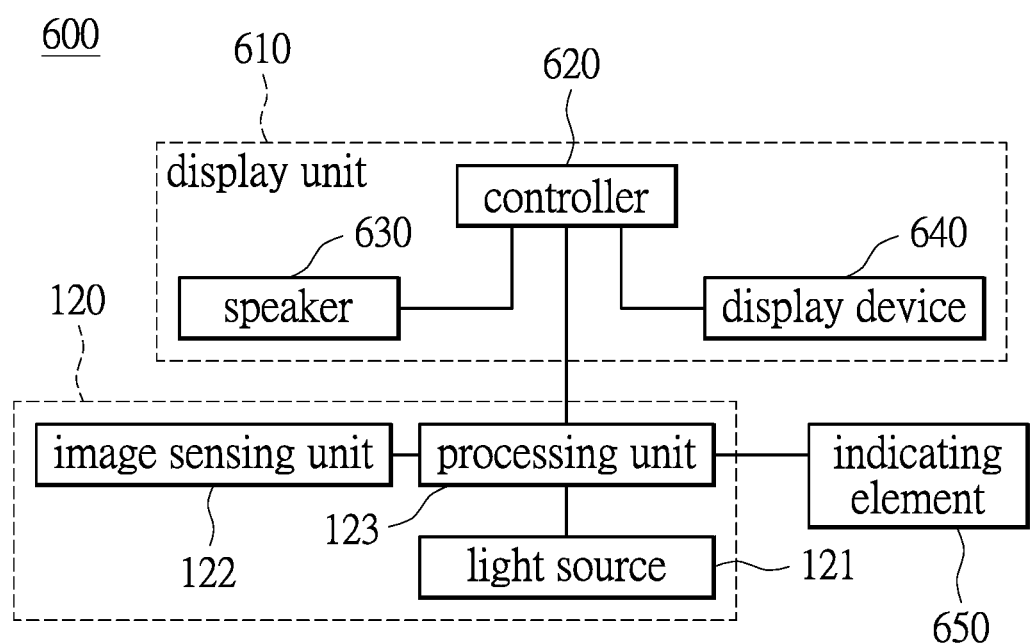
FIG. 6B is a circuit block diagram of the display apparatus shown in FIG. 6A.

FIG. 6B is a circuit block diagram of the display apparatus shown in FIG. 6A. Please refer to FIG. 6A and FIG. 6B. The display apparatus 600 includes a display unit 610 and a gesture sensor 120. The display unit 610 may receive channel signals and show corresponding images. The display unit 610 may be a television such as a liquid crystal television, a plasma television, an organic light emitting television or cathode ray tube television (CRT TV). In addition, the aforementioned channel signals include audio signals and video signals.

The gesture sensor 120 may control the display unit 610. By using the gesture sensor 120, the user can control the television, i.e., the display unit 610 without touching the television. Specifically, the display unit 610 may include a controller 620 and a display device 640 electrically connected thereto. The controller 620 may include a motherboard and electronic components disposed thereon. The display device 640 having a pixel array can show image. The display device 640 for example is a liquid crystal module (LCM), an organic light emitting diode panel or a plasma display panel.

A signal link is established between the gesture sensor 120 and the display unit 610. For example, the processing unit 123 of the gesture sensor 120 may be electrically connected to the controller 620 of the display unit 610 through wires or a printed circuit board. Alternatively, both of the processing unit 123 and the controller 620 have a wireless receiving/transmitting module, and the communication between the processing unit 123 and the controller 620 can be established through their wireless receiving/transmitting modules. The wireless receiving/transmitting module may be for example an infrared signal receiving/transmitting module or a Bluetooth receiving/transmitting module.

Accordingly, the gesture sensor 120 is capable of detecting the various gestures performed by the user's hand H1 and transmits the corresponding control commands to the controller 620 according to the gestures. Thus, the controller 620 can control the display device 640 according to the control commands. The methods performed by the gesture sensor 120 to reorganize the gestures are described comprehensively in the abovementioned embodiments and omitted herein.

While a control gesture such as fist, palm, hand wave, or palm motion along the counterclockwise direction C1 or the clockwise direction C2 is performed by the user with the hand H1, the hand H1 can reflect the light E1 to be the light R1. The image sensing unit 122 can receive the light R1 and capture the image from the light R1. As such, the image sensing unit 122 can capture gesture images from the various control gestures performed by the user with the hand H1. The gesture images are formed due to the reflection of the light E1, i.e., the light R1.

It's worth noting that in the present embodiment, the gesture sensor 120 includes the light source 121 to emit the light E1. However, in other embodiment, it is not necessary for the gesture sensor 120 to include the light source 121, and the image of the hand H1 can be captured by the image sensing unit 122 directly. Specifically, the hand H1 can reflect the external light, which, for example, comes from the indoor light or the outdoor sunlight. The image sensing unit 122 can capture the image from the external light reflected by the hand H1. Similarly, the image sensing unit 122 can also capture various gesture images from the control gestures performed by the user with the hand H1. Therefore, the above mentioned gesture image is not limited to be formed by the reflection of the light E1 (which is light R1). The above mentioned gesture image can also be formed by the external light source.

The processing unit 123 may send a gesture control signal including different commands. In one embodiment, the gesture control signal may include a turn-on command and a turn-off command which are respectively corresponding to different gesture images. The controller 620 decides to switch the display device 640 on according to the turn-on command, and to switch the display device 640 off according to the turn-off command. Specifically, the controller 620 has a switching module (not shown in FIG. 6B), and the controller 620 controls whether the power is supplied to the display device 640 through the switching module.

When the display unit 610 is in switch-off state (e.g. the display apparatus 600 may be supplied with power of an external power source, but the display device 640 may be not supplied with power), the user can perform a control gesture which is corresponding to the turn-on command ahead of the gesture sensor 120. The image sensing unit 122 can capture the control gesture image, and transmit the control gesture image to the processing unit 123. The processing unit 123 can transmit the turn-on command to the controller 620 according to the control gesture image so that the display device 640 can be supplied with power and be switched on.

When the display unit 610 is in switch-on state (e.g. the display apparatus 600 is displaying image), the user can perform the control gesture corresponding to the turn-off command with hand H1. Meanwhile, the processing unit 123 sends a turn-off command to the controller 620 according to the control gesture image captured by the image sensing unit 122 to turn off the display unit 610.

In another embodiment, the gesture control signal sent by the processing unit 123 may include a channel switching command. The controller 620 can switch the channel received by the display unit 610 according to the channel switching command. The channel switching command is for example a channel scan up command, a channel scan down command or a channel selection command. These channel switching commands are respectively corresponding to different control gestures. For example, the hand H1 gesture of the open palm facing to the image sensing unit 122 and moving up is corresponding to the channel scan up command, and the hand H1 gestures of the open palm facing to the image sensing unit 122 and moving down is corresponding to the channel scan down command. If the user performs a finger gesture which indicates a set of numbers, the finger gesture is corresponding to the channel selection command and the set of numbers is corresponding to the channel number.

Namely, the controller 620 can scan the channel received by the display unit 610 up in sequence according to the channel scan up command, and scan the channel down in sequence according to the channel scan down command. Specifically, the controller 620 includes a receiving module (not shown in FIG. 6B). When the user performs the gesture corresponding to the channel switching command, the processing unit 123 transmits the channel switching command to the controller 620 so as to control the receiving module to switch current channel to other channel.

In another embodiment, the gesture control signal may include a volume command. The processing unit 123 transmits the volume command to the controller 620 so as to adjust the value of the volume displayed by the display unit 610. The volume command is for example an increasing volume command or a decreasing volume command, which are respectively corresponding to different control gestures. For instance, the hand H1 gesture of palm rotating in clockwise direction is corresponding to the increasing volume command, whereas the hand H1 gesture of open palm rotating in counterclockwise direction is corresponding to the decreasing volume command. The processing unit 123 recognizes the user's gesture motion and controls the controller 620 to execute the corresponding volume commands displayed by the display unit 610. Specifically, the display unit 610 includes a speaker 630 which is electrically connected to the controller 620. When the controller 620 receives the volume command from the processing unit 123, the controller 620 is capable of adjusting the volume through controlling the speaker 630.

In the abovementioned embodiment, a link between the processing unit 123 and the controller 620 is always maintained. However, in another embodiment, the link between the processing unit 123 and the controller 620 is terminated until a startup gesture is captured by the image sensing unit 122. When a termination gesture is captured by the image sensing unit 122, the link between the processing unit 123 and the controller 620 would be interrupted.

That is to say, before the signal link between the processing unit 123 and controller 620 is established, the display apparatus 600 would not work even if the user performs the control gestures in front of the display apparatus 600. However, the general methods, such as touching the display apparatus 600 or using the remote control, still can be performed by the user to operate the display apparatus 600. Specifically, while the user wants to perform the operation of the display apparatus 600, the user firstly has to perform the startup gesture. The image sensing unit 122 captures a startup gesture image, and the processing unit 123 transmits a startup command to the controller 620 according to the startup gesture image. As such, the link between the processing unit 123 and the controller 620 can be established. In addition, in one embodiment, the user can performs the termination gesture when the user wants to perform the operation of the display apparatus 600 by the general methods. The image sensing unit 122 captures a termination gesture image, and the processing unit 123 receives the termination gesture image and then, terminates the link between the processing unit 123 and the controller 620.

The display apparatus 600 may further includes an indicating element 650. The signal link between the indicating element 650 and the processing unit 123 is established through a wire or wireless communication network, such as through Bluetooth communication. The indicating element 650 may indicate the link state between the controller 620 and the processing unit 123. That is, when the image sensing unit 122 captures the startup gesture image performed by the user, the processing unit 123 connects with the controller 620 according to the startup gesture image and controls the indicating element 650 to indicate the startup state. When the image sensing unit 122 captures the termination gesture image performed by the user, the processing unit 123 disconnects with the controller 620 and controls the indicating element 650 to indicate the disconnected state.

In the embodiment shown in FIG. 6, the indicating element 650 may include an indicating light, such as a light-emitting diode (LED) or a cold cathode fluorescent lamp (CCFL). For instance, when the link between the processing unit 123 and the controller 620 is established, the indicating light is turned on to indicate the startup state. When the link between the processing unit 123 and the controller 620 is terminated, the indicating light is turned off to indicate the disconnected state.

In addition, in another embodiment, the aforementioned commands, such as the startup command, the link termination command, the channel switching command, the volume command, the turn-on command and the turn-off command, and the gestures respectively corresponding thereto can be displayed on the display device 640 through the on-screen display techniques so as to instruct the user to operate the display apparatus 600 by performing the gesture.

For example, the display device 640 may display a text and/or pattern to indicate that the palm rotating in clockwise direction is corresponding to adjust the volume louder, and the palm rotating in counterclockwise is corresponding to adjust the volume lower. As such, the user can operate the display apparatus 600 according to the instruction shown on the display device 640.

Furthermore, in the instant embodiment, the startup gesture image corresponding to the startup command may be opening the palm, and the termination gesture corresponding to the link termination command may be making a fist. The text and/or pattern may be illustrated on the housing of the display device 640 to instruct that opening the palm to start the gesture operation, and making a fist to terminate the gesture operation. It has to be explain that the abovementioned startup gesture, the termination gesture, turn-on gesture, turn-off gesture and channel switching gesture may be making a fist, opening a palm, wave a hand, rotating the palm in clockwise direction, rotating the palm in counterclockwise direction, or the other gestures. The aforementioned examples of the control gestures and the functions corresponding thereto do not intend to limit the instant embodiment.

Figure 7A:
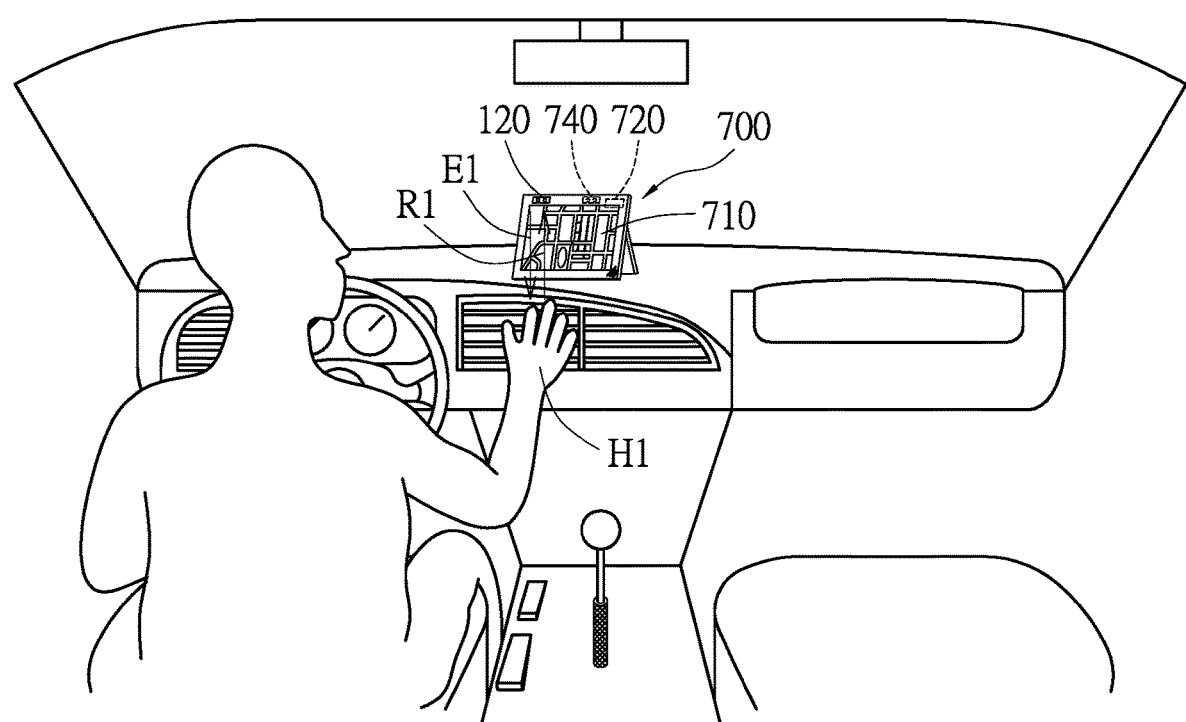
FIG. 7A is a schematic diagram of a satellite navigation apparatus in accordance with one embodiment of the instant disclosure.
Figure 7B:
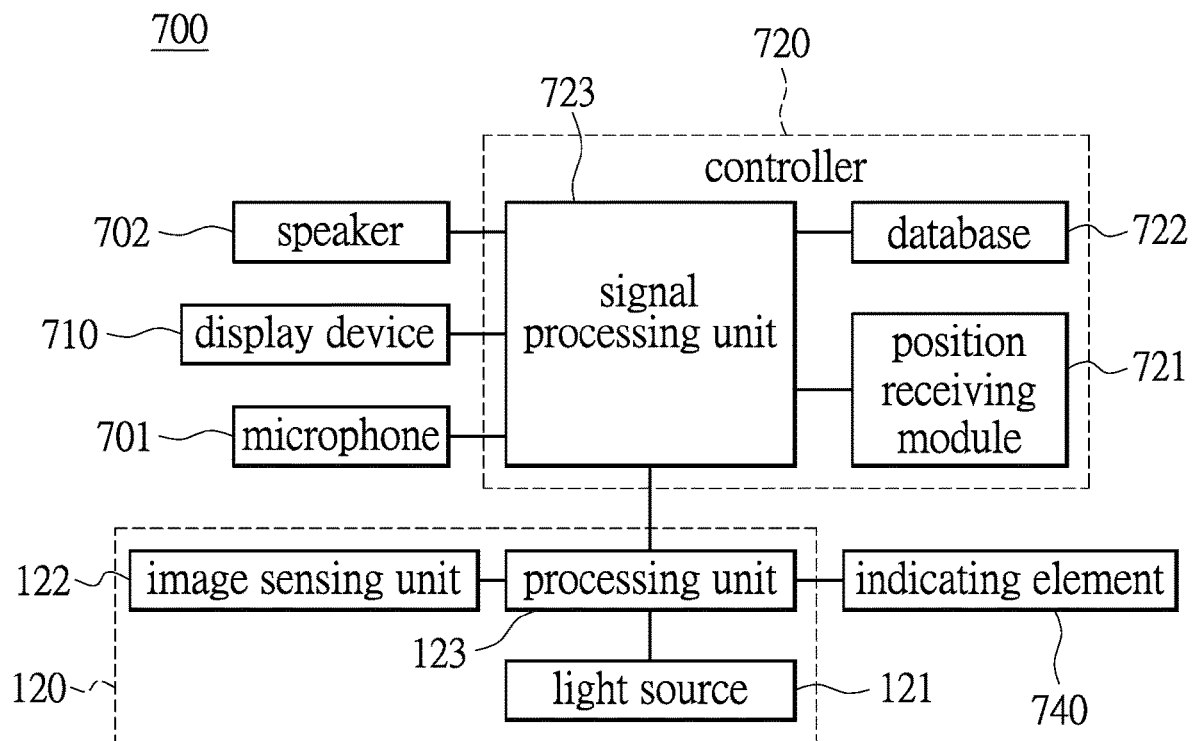
FIG. 7B is a circuit block diagram of the satellite navigation apparatus shown in FIG. 7A.

Notably, the display apparatus may be a satellite navigation apparatus. The embodiment of the satellite navigation apparatus would be explained in detail in the following descriptions with an assistance of FIG. 7A and FIG. 7B. In addition, the features in the satellite navigation apparatus as shown in FIG. 7A and FIG. 7B similar to the aforementioned embodiment are not described below in principle. For example, the method for recognizing the gesture by gesture sensor would not be repeated hereinafter.

FIG. 7A is a schematic diagram of a satellite navigation apparatus in accordance with one embodiment of the instant disclosure. FIG. 7B is a circuit block diagram of the satellite navigation apparatus shown in FIG. 7A. In the instant embodiment, the satellite navigation apparatus 700 includes a display device 710, a controller 720 and a gesture sensor 120.

The display device 710 has a pixel structure including a plurality of pixels for displaying images. The display device 710 is for example a liquid crystal module (LCM), an OLED display panel or a plasma display panel.

The controller 720 may be configured in the inside or outside of the display device 710, and a signal link between the controller 720 and the display device 710 is established so that map information and coordinate information can be transmitted to and displayed on the display device 710. Please refer to FIG. 7B, the controller 720 includes a position receiving module 721, a database 722 and a signal processing unit 723. The database 722 is used to store at least one map information, and the position receiving module 721 may be a global positioning system (GPS) receiver for receiving at least one satellite signal.

The signal processing unit 723 electrically connects with the position receiving module 721, the database 722 and the display device 710. Furthermore, the signal processing unit 723 is used to receive and process the satellite signal transmitted by the position receiving module 721. The satellite signal is converted to coordinate information, which usually indicates the position where the satellite navigation apparatus 700 is located. As the satellite navigation apparatus 700 is being moved with a car driven by the user, the satellite signal is continuously received by the position receiving module 721 and transmitted to the signal processing unit 723 to renew the coordinate information. In addition, the signal processing unit 723 retrieves the map information and transmits the map information to the display device 710 in conjunction with the coordinate information for displaying.

After the user input a target address, the signal processing unit 723 receives an input data and calculates target coordinate information associated with the target address. Furthermore, the signal processing unit 723 is capable of calculating at least one path information according the target coordinate information, the coordinate information and the map information. The path information includes a plurality of the coordinate points, the connecting line of which is a path extending form the user's position to the target address.

The signal processing unit 723 is capable of controlling the display device 710 to display the map information, the coordinate information and path information. In one embodiment, the display device 710 may be controlled by the signal processing unit 723 to display the map information, the coordinate information and path information in different modes for example 2D, 3D or mixed display mode.

The switching between different modes (2D, 3D or mixed display mode) can be performed according to the user's instruction.

That is to say, the map information, the coordinate information and the path information can be displayed in different modes on the display device 710. In the embodiment of the instant disclosure, the gesture sensor 120 controls the controller 720 according to the user's hand gesture so that the display device 710 can control the display mode of the map information, the coordinate information and the path information according to the gesture performed by the user's hand H1. The detail descriptions are explained as below.

Please refer to FIG. 7A and FIG. 7B. In the instant embodiment, the gesture sensor 120 includes a light source 121, an image sensing unit 122 and a processing unit 123. The processing unit 123 can be electrically connected to the signal processing unit 723 of the controller 720 through wire communication technique. In another embodiment, the processing unit 123 may establish a signal link with the controller 720 through wireless communication technique, such as Bluetooth. By using wire or wireless communication technique, the gesture sensor 120 is capable of sending the gesture control signal to command the controller 720.

The light source 121 can emit the light E1 to the hand H1 of the user. The hand H1 can reflect the light E1 to be the light R1. By utilizing the light E1, the image sensing unit 122 can capture various gesture images from the various control gestures performed by the hand H1. The control gestures includes making a fist, opening the palm, waving the hand, rotating the palm in clockwise direction, rotating the palm in the counterclockwise direction, or other kinds of gestures. The gesture image is formed due to the reflection of the light E1, i.e., the light R1.

The processing unit 123 can send several gesture control signals to the signal processing unit 723 of the controller 720 according to the gesture images. The signal processing unit 723 of the controller 720 may switch the display mode of the map information and coordinate information on the display device 710 according to the gesture control signal.

Specifically, the gesture control signal may include a first switching command for switching the 2D display mode to 3D display mode and a second switching command for switching a stereoscopic map (the 3D display mode) to a planimetric map (the 2D display mode). The first switching command and the second switching command are respectively corresponding to different gestures. For example, the first switching command is corresponding to a two-fingered gesture, and the second switching command is corresponding to a three-fingered gesture. When the processing unit 123 recognizes the gesture corresponding to the first switching command, the processing unit 123 transmits the first switching command to the controller 720 so as to switch the display mode to 2D display mode for displaying the planimetric map. When the processing unit 123 recognizes the gestures corresponding to the second switching command, the processing unit 123 transmits the second switching command to the controller 720 so as to switch the display mode to 3D display mode for display the stereoscopic map.

In addition, the gesture control signal may include a zoom-in command, a zoom-out command, a panning command and a scrolling command, which are respectively corresponding to different control gestures. For example, the zoom-in command is corresponding to the gesture of moving the finger away from the thumb, and the zoom-out command is corresponding to the gesture of moving the finger toward the thumb. The image sensing unit 122 captures the gesture image of the user, and the processing unit 123 transmits the gesture control signal to the controller 720 so as to control the scale of map information displayed on the display device 710 to be enlarged or diminished.

Furthermore, the user may control the satellite navigation apparatus 700 to be switched on or off through the gestures. Specifically, the user can perform a switch-on gesture and a switch-off gesture so as to control the satellite navigation apparatus 700. The switch-on gesture is for example opening and closing palm repeated three times and maintained in open-palm state at the last time for three seconds. The switch-off gesture is for example closing and opening palm repeated three times and maintained in closed fist state for three seconds. When the image sensing unit 122 captures the switch-on gesture, the processing unit 123 sends a switch-on command to the controller 720 so that the controller 720 control the display device 710 to be turned on according to the switch-on command. When the image sensing unit 122 captures the switch-off gesture, the processing unit 123 sends a switch-off command to the controller 720 so that the controller 720 control the display device 710 to be turned off according to the switch-off command.

The satellite navigation apparatus 700 of the instant embodiment may include a microphone 701 electrically connected to the controller 720. When the microphone 701 is turned on, the user can input the target address through the microphone 701. The controller 720 receives the data inputted by the user and calculates target coordinate information associated with the target address. In the instant embodiment of the present disclosure, the user can perform a gesture to turn on the microphone 701 so that the target address can be inputted by the user' voice.

Specifically, the image sensing unit 122 captures the control gesture image, and the processing unit 123 transmits a voice input command or an end command to the controller 720. That is to say, the gesture control signal sent out from the processing unit 123 may include the voice input command or the end command. In the instant embodiment, the voice input command and end command are respectively corresponding to different control gestures. When the controller 720 receives the voice input command transmitted by the processing unit 123, the controller 720 controls the microphone 701 to be turned on for receiving the user's voice message according to the voice input command. When the controller 720 receives the end command transmitted by the processing unit 123, the controller 720 controls the microphone 701 to be turned off according to the end command. It is worth nothing that, in the instant embodiment, the user inputs the target address through the microphone 701, which does not intend to limit the instant disclosure, and the other means for inputting the target address can be taken by the user, such as through a touch panel.

In another embodiment, the satellite navigation apparatus 700 may include a speaker 702 for playing sound. The speaker 702 is electrically connected to the controller 720. In addition, the speaker 702 and the microphone 701 may be two independent devices or be incorporated into one voice receiving/playing module. In the instant embodiment, the user can controls the execution or termination of the voice guiding function by performing the gestures.

Specifically, when the image sensing unit 122 captures a voice guide executing gesture performed by the user, the processing unit 123 transmits a voice guide executing command to the controller 720. The controller 720 converts the path information into sound signal, and controls the speaker 720 to play the voice according to the sound signal. As such, the user can be guided by the voice and drive according to the path information. When the image sensing unit 122 captures a voice guide terminating gesture performed by the user, the processing unit 123 transmits a voice guide terminating command to the controller 720. The controller 720 terminates the transmission of the sound signal and the speaker 702 stop to play. That is to say, the gesture control signal transmitted by the processing unit 123 may include the voice guide executing and terminating commands, which are respectively corresponding to different gestures.

The satellite navigation apparatus 700 of the instant embodiment also includes an indicating element 740. The indicating element 740 may be an indicating light electrically connected to the processing unit 123 or established a signal link with the processing unit 123 by the wireless technique, such as Bluetooth. The indicating element 740 may be used to indicate the link state between the controller 720 and the processing unit 123. That is, when the image sensing unit 122 captures the startup gesture performed by the user, the processing unit 123 establishes a signal link with the controller 720 according to the startup gesture image, and controls the indicating element 720 to indicate the startup state.

In one embodiment, when the image sensing unit 122 captures a startup gesture image performed by the user, the processing unit 123 establishes the signal link with the controller 720. That is, before the signal link between the processing unit 123 and the controller 720 is established, the satellite navigation apparatus 700 does not work even if the user performs the control gestures in front of the display apparatus 600. However, the user can operate the satellite navigation apparatus through the other means.

When the user wants to terminate the gesture operation of the satellite navigation apparatus 700, the user can performs a termination gesture. When the image sensing unit 122 captures a termination gesture image, the processing unit 123 terminates the signal link between the processing unit 123 and the controller 720, and controls the indicating member 740 to be turned off.

In the instant embodiment, the aforementioned commands, such as the startup command, the zoom-in command, the zoom-out command, the voice input command, the link termination command and so on, and the gestures respectively corresponding thereto can be displayed on the display device 710 through the on-screen display techniques so as to instruct the user to operate the satellite navigation apparatus 700 by performing the gesture. Accordingly, while the user is driving the car, the user can control some operations of the satellite navigation apparatus, such as inputting address, enlarging or reducing the map, executing the voice guide and so on.

Figure 8A:
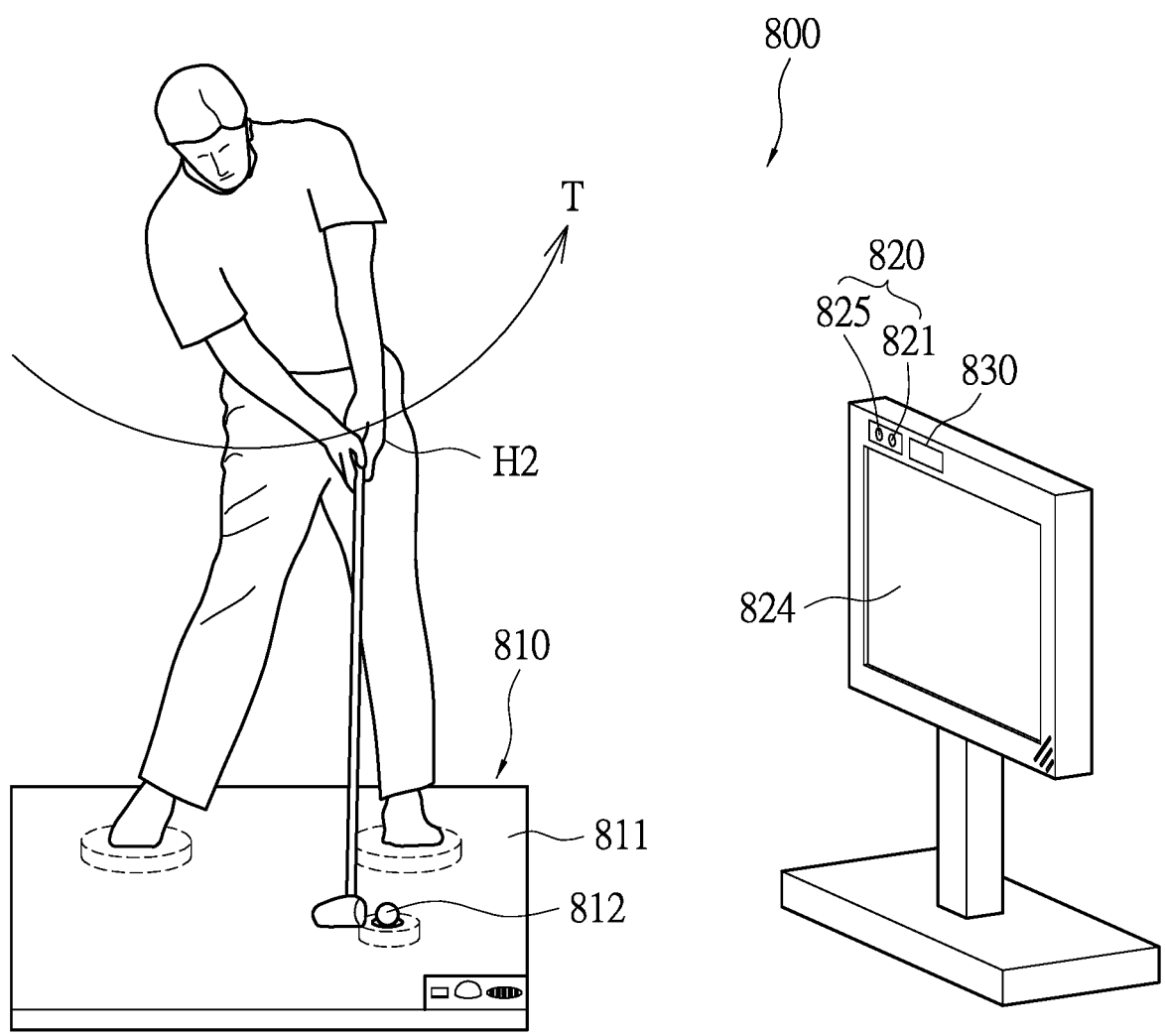
FIG. 8A is a schematic diagram of a golf training apparatus in accordance with one embodiment of the instant disclosure.
Figure 8B:
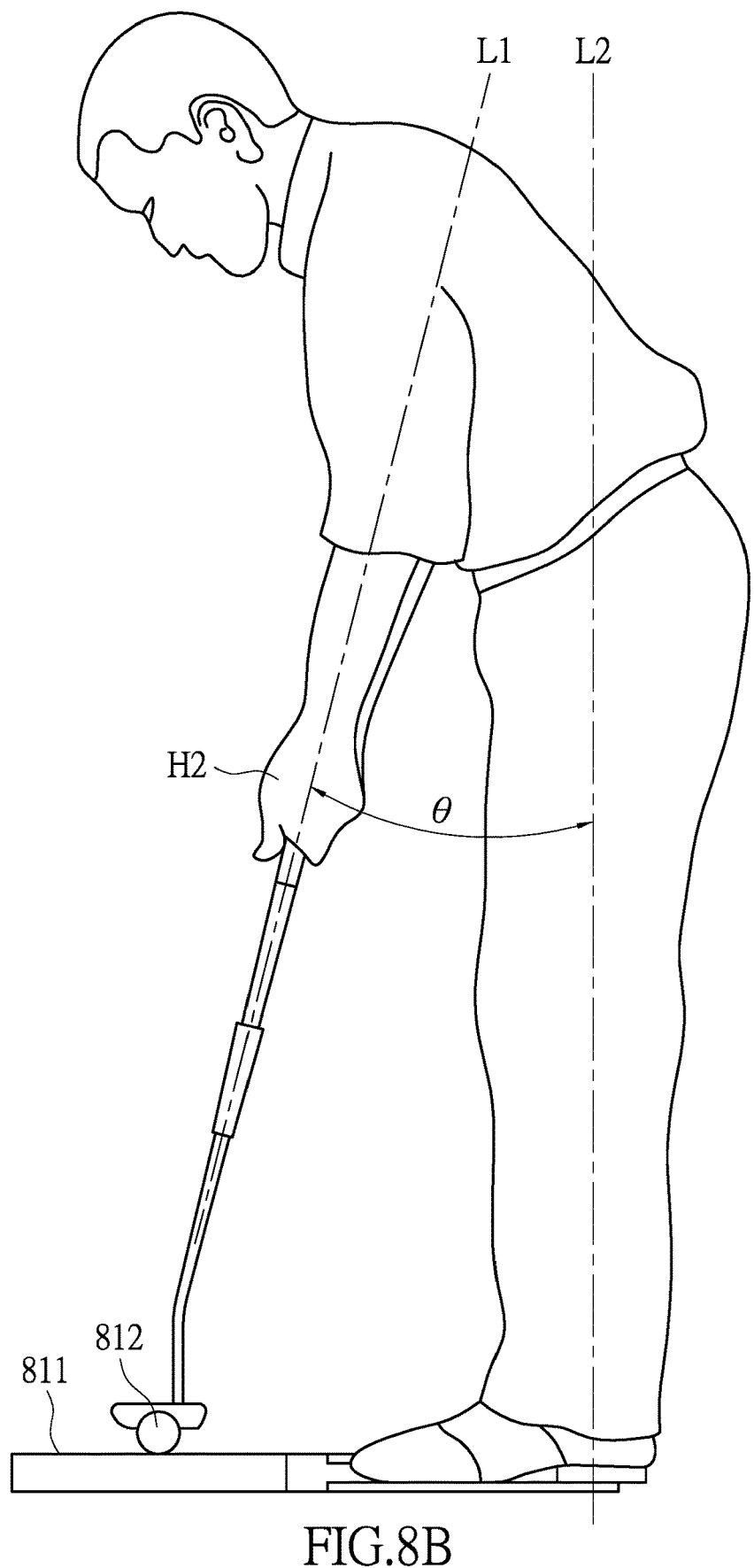
FIG. 8B shows a user's image captured by an image capturing unit shown in FIG. 8A.
Figure 8C:
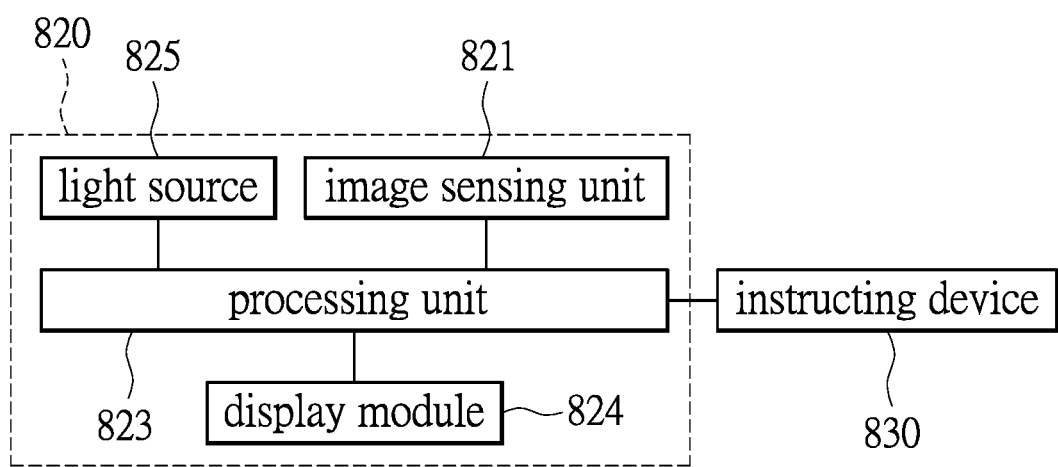
FIG. 8C is a circuit block diagram of the satellite navigation apparatus shown in FIG. 8A.

The apparatus having gesture sensor in one embodiment of the instant disclosure may be a golf training apparatus. In the instant embodiment, the golf training apparatus would be described in connection with FIG. 8A, FIG. 8B and FIG. 8C in detail below. FIG. 8A is a schematic diagram of a golf training apparatus in accordance with one embodiment of the instant disclosure. FIG. 8B shows a user's image captured by an image capturing unit shown in FIG. 8A, and FIG. 8C is a circuit block diagram of the satellite navigation apparatus shown in FIG. 8A. The golf training apparatus may be used to detect the user's pose through the gesture sensor so that the user's pose can be corrected.

The golf training apparatus 800 includes a practice device 810, the gesture sensor 820 and the instructing device 830. The gesture sensor 820 establishes a signal link with the instructing device 830.

The practice device 810 may include a fairway 811 and a ball 812. The fairway 811 is designed according to the simulation of the golf course. The user can practice swing or putting to hit the ball 812 placed on the fairway 811. The fairway 811 may be a swing practice mat or a putting practice mat. FIG. 8A shows the user standing on the fairway 811 holds the golf club with a hand H2 and aims the ball 812 to make a swing practice. During swing, the hand H2 may move along a trace T. As the ball 812 is impacted by the golf club, the user's hand H2 is located just at the lowest position of the trace T. For the user who is practicing swing or putting, whether the posture of the user at moment of impact is correct would significantly affect the result of the impact.

Please refer to FIG. 8B, the gesture sensor 820 includes an image sensing unit 821 and a processing unit 823. Both of the processing unit 823 and the processing unit 823 establish a signal link with the instructing device 830. As the user starts to practice, the image sensing unit 821 captures at least one user's image. The user's image captured when the user's hand is located at the lowest position of the trace T. The user's image may show the side view of the user which includes at least one hand image and at least one leg image. The hand image may include a fist image and an arm image, and the leg image may include a thigh image and a calf image.

The gesture sensor 820 may further include a light source 825 which is utilized to emit a light toward the user and electrically connected to the processing unit 823. The image sensing unit 821 is located adjacent to the light source 825, and the user's image is formed due to the reflection of the light. In one embodiment, the light is invisible light, however, in another embodiment, the light may be sunlight or emitted from an indoor lamp.

The processing unit 823 receives the user's image and recognizes the hand image and leg image to proceed with the analysis. Specifically, the processing unit 823 defines a fist axial line L1 form the hand image, and defines a second axial line L2 form the leg image. The first axial line L1 and the second axial line L2 form an angle θ. The angle θ is corresponding to the angle formed by user's arm and user's leg as the ball 812 is impacted.

The processing unit 823 may store at least one reference angle which is associated with a correct swing posture, and the reference angle has a predetermined range. In another embodiment, the processing unit 823 may store many different reference angles which have different ranges and respectively corresponding to different conditions. For example, the reference angle has the predetermined range from 10 to 170 degree corresponding to the swing practice, and another reference angle has another predetermined range from 2 to 85 degree corresponding to the putting practice. In addition, the predetermined range may be set according to the user's height or the types of the golf club used by the user during practice.

In one embodiment, the gesture sensor 820 may further include a display module 824, which may be a liquid crystal display module or a touch panel display module. The processing unit 823 may control the display module 824 to show the conditions, such as height, the type of the golf club, the type of practice and so on, so that the user can select the appropriate conditions. In one embodiment, before the user starts to practice, the user can perform the gesture to select the conditions. For example, the display module 824 shows two practice options, such as swing practice and putting practice, which are respectively corresponding to different gestures. For instance, selecting the swing practice is corresponding to a one-figure gesture, and selecting the putting practice is corresponding to a two-finger gesture. The image sensing unit 821 captures the gesture performed by the user, and transmits to the processing unit 823. The processing unit 823 recognizes the gesture image to determine the conditions selected by the user, and calculates the predetermined range of the reference angle which satisfies the requirements of the conditions. After the predetermined range of the reference angle is calculated, the processing unit 823 determines whether the measured angle θ falls within the predetermined range. When the measured angle θ falls out of the predetermined range, the processing unit 823 sends an instructing signal to the instructing device 830 to remind the user to correct his posture.

The instructing device 830 may be one or more indicating lamps and/or a speaker. The indicating lamps may be LED lamps having one or more different colors to indicate the measured results. In another example, the indicating lamps are used to display the reminding message with the instruction for correcting the user's posture. Specifically, if the measured angle θ falls within the predetermined range, which represents the user's posture is correct during impacting the ball 812, the indicating lamps would emit green light. If the measured angle θ falls out of the predetermined range, which indicates the user's posture is wrong during impacting ball 812, the indicating lamps would emit red light. In addition, the speaker may play many kinds of indicating sounds associated with the measured results. For example, the indicating sounds may be vocal sounds so as to instruct the user on how to adjust the posture by vocal, or may be a part of music for reminding the user.

In another embodiment, the golf training apparatus 800 may be used to measure the swing velocity as the golf club impacts the ball 812. Specifically, the image sensing unit 821 may capture a plurality of the sequential user's images at different times and transmit to the processing unit 823. Each of the sequential user's images may shows the side view of the user and include at least one hand image. At least one of the sequential user's images is captured when the user's hand H2 is located at the lowest position of the trace T.

The processing unit 823 receives the sequential user's images and recognizes the hand image. The processing unit 823 is capable of calculating the relative distance between the user's hand H2 and the gesture sensor 820 according to an occupied area of the hand image in the user's image. Specifically, the processing unit 823 may further include a database for storing a reference table. The relationship between the occupied area of the hand image and the relative distance would be listed in the reference table. Accordingly, after the processing unit 823 recognizes the hand image and calculates the occupied area of the hand image in the user's image, the relative distances between the user's hand H2 and the gesture sensor 820 at different times can be acquired according to the reference table. The processing unit 823 is capable of calculating the swing velocity of the user according to the variation of the occupied area of the hand image with the time change. Especially when the user's hand H2 moves along the trace T to the lowest position of the trace, the instantaneous velocity of the user's hand H2 can be calculated.

The database of the processing unit 823 may store a velocity range. The processing unit 823 analyzes the swing velocity according to the sequential user's image and determines whether the swing velocity falls within the velocity range. When the swing velocity falls out of the velocity range, the processing unit 823 transmits the instructing signal to the instructing device 830 to inform the user.

In addition, because the swing velocity in swing practice is different from that in putting practice, the database of the processing unit 823 may store several sets of the velocity ranges which are respectively corresponding to different conditions. Before starting to the golf practice, the user can set the types of practice, and the processing unit 823 would select the appropriate velocity range according to the user's selection.

To sum up, the above mention water supply, water tap and the toilet of the embodiment in the present invention utilize the gesture sensor and the control valve to control flow. The user can perform various gestures to the gesture sensor to control the control valve. Hence, the user can control the water supply, the water tap, and the toilet to supply different discharges or output amount of flow by utilizing the gesture sensor without touching the switch button. In addition, the display apparatus of the embodiments in the instant disclosure utilize the gesture sensor and the controller to control the operation. As such, even if in the kitchen or in the bathroom, the user can control the display apparatus without directly touching the display apparatus. The golf training apparatus of the embodiment in the instant disclosure utilize the gesture sensor so that the swing posture of the user can be adjusted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A system, comprising:
a water supply, comprising:
 a body comprising a water outlet to supply a flow; and
 a control valve configured on the body to control the flow;
a gesture sensor, connecting wirelessly with the water supply, comprising:
 an image sensing unit to capture at least a gesture image performed by the user and capture a shutdown gesture image performed by the user; and
 a processing unit electrically connected to the image sensing unit, wherein the processing unit sends at least a control command to the control valve according to the gesture image, the control command comprises a first-discharge command or a second-discharge command, the control valve controls the discharge of the flow as the first-discharge or the second-discharge according to the first-discharge command or the second-discharge command, and the processing unit shuts off the control valve according to the shutdown gesture image, wherein the first discharge is larger than the second discharge; and
a display device electrically connecting to the gesture sensor, and the display device comprising:
 an indicator translucent panel, wherein a surface of the indicator translucent panel shows letters or patterns to represent a gesture of counterclockwise rotation corresponding to the first discharge of the flow and a gesture of clockwise rotation corresponding to the second discharge of the flow, and the water supply is manipulated, by the user performing a gesture according to the letters or the patterns shown in the indicator translucent panel, to change the discharge of the flow.

2. The system of claim 1, wherein the movement of the shutdown gesture image comprises making the fist, opening the palm, or waving the hand.

3. The system of claim 1, wherein the control command comprises a water supply command or a water outage command, the control valve starts up the water outlet according to the water supply command, so as to supply the flow, and the control valve shuts off the water outlet according to the water outage command, so as to stop the flow.

4. A system, comprising:
   a water tap, comprising:
      a tap body comprising a water outlet to supply a flow; and
      a control valve configured on the tap body to control the flow; and
   a gesture sensor, connecting wirelessly with the water tap, comprising:
      an image sensing unit to capture at least a gesture image performed by the user; and
      a processing unit electrically connected to the image sensing unit, wherein the processing unit sends at least a control command to the control valve according to the gesture image, the control command comprises a decrement command or an increment command, the control valve decreases the discharge of the flow according to the decrement command, and the control valve increases the discharge of the flow according to the increment command; and
   a display device electrically connecting to the gesture sensor, and the display device comprising:
      an indicator translucent panel, wherein a surface of the indicator translucent panel shows letters or patterns to represent a gesture of counterclockwise rotation corresponding to decreasing the discharge of the flow and a gesture of clockwise rotation corresponding to increasing the discharge of the flow, and the water tap is manipulated, by the user performing a gesture according to the letters or the patterns shown in the indicator translucent panel, to change the discharge of the flow.

5. The system of claim 4, wherein the movement of the gesture image comprises making the fist, opening the palm, waving the hand, turning the palm in the clockwise direction or turning the palm in the counterclockwise direction.

6. The system of claim 4, wherein the gesture sensor further comprises a light source, the light source is utilized to emit a light toward the user and electrically connected to the processing unit, the image sensing unit is adjacent to the light source, and the gesture image is formed by the reflection of the light.

* * * * *